(12) United States Patent
Rehkemper et al.

(10) Patent No.: US 6,461,238 B1
(45) Date of Patent: Oct. 8, 2002

(54) PORTABLE SIMULATION GAME APPARATUS

(75) Inventors: Steven Rehkemper; Ryan Kratz, both of Chicago, IL (US)

(73) Assignee: Rehco, LLC, Chicago, IL (US)

( * ) Notice: Subject to any disclaimer, the term of this patent is extended or adjusted under 35 U.S.C. 154(b) by 0 days.

(21) Appl. No.: 09/927,873

(22) Filed: Aug. 13, 2001

Related U.S. Application Data

(63) Continuation-in-part of application No. 09/631,819, filed on Aug. 3, 2000.

(51) Int. Cl.[7] ................................................. A63F 13/00
(52) U.S. Cl. ................... 463/6; 463/7; 463/30; 463/36; 463/37; 463/63; 273/442; 345/158; 446/7; 446/236; 446/237
(58) Field of Search ................................ 463/1, 6–7, 30, 463/36–38, 62–63, 67–68; 273/246, 441–442, 444, 459–461; 434/61–62, 66–67; 446/7, 168–169, 173–174, 236–237, 268–269, 272, 275, 279–280, 286, 289–290, 292, 431, 433–434, 444–445, 448–449, 465

(56) References Cited

U.S. PATENT DOCUMENTS

| | | | | |
|---|---|---|---|---|
| 2,504,007 A | * | 4/1950 | Delclerco | 272/73 |
| 2,627,674 A | * | 2/1953 | Wilson | 35/11 |
| 2,672,696 A | * | 3/1954 | Wentz | 35/11 |
| 3,707,781 A | * | 1/1973 | Brown | 35/11 |
| 4,270,306 A | * | 6/1981 | Klawitter | 46/248 |
| 4,474,372 A | * | 10/1984 | Karasawa | 273/1 GA |
| 4,932,913 A | * | 6/1990 | Raviv et al. | 446/7 |
| 4,940,234 A | * | 7/1990 | Ishida et al. | 273/1 GA |
| 4,986,114 A | * | 1/1991 | Rothmann et al. | 73/117 |
| 5,106,102 A | * | 4/1992 | Mitsumoto | 273/442 |
| 5,692,956 A | * | 12/1997 | Rifkin | 463/37 |
| 5,707,237 A | * | 1/1998 | Takemoto et al. | 434/69 |
| 5,919,092 A | * | 7/1999 | Yokoi et al. | 463/37 |
| 5,967,898 A | * | 10/1999 | Takasaka et al. | 463/37 |
| 5,971,855 A | * | 10/1999 | Ng | 463/42 |
| 5,989,123 A | * | 11/1999 | Tosaki et al. | 463/37 |
| 6,123,547 A | * | 9/2000 | Teresi | 434/61 |
| 6,132,315 A | * | 10/2000 | Miyamoto et al. | 463/43 |
| 6,155,928 A | * | 12/2000 | Burdick | 463/46 |
| 6,200,219 B1 | * | 3/2001 | Rudell et al. | 463/37 |

\* cited by examiner

*Primary Examiner*—Valencia Martin-Wallace
*Assistant Examiner*—Scott E. Jones

(57) ABSTRACT

The present invention describes a portable simulation game apparatus that permits a user operating the game apparatus to move or control a three dimensional object. The movement or current position of the three dimensional object is sensed by a plurality of sensors and transmitted to a circuit board or a control means. The control means may then relate the movement or position of the three dimensional object to pre-programmed images displayed in front of the three dimensional object, on a display means. Typically, the pre-programmed images being displayed represent a race or a track for which the three dimensional object, being a vehicle, may interact therewith. To move the three dimensional object, the user tilts or moves the game apparatus in a specific direction the user wants the object to move.

38 Claims, 27 Drawing Sheets

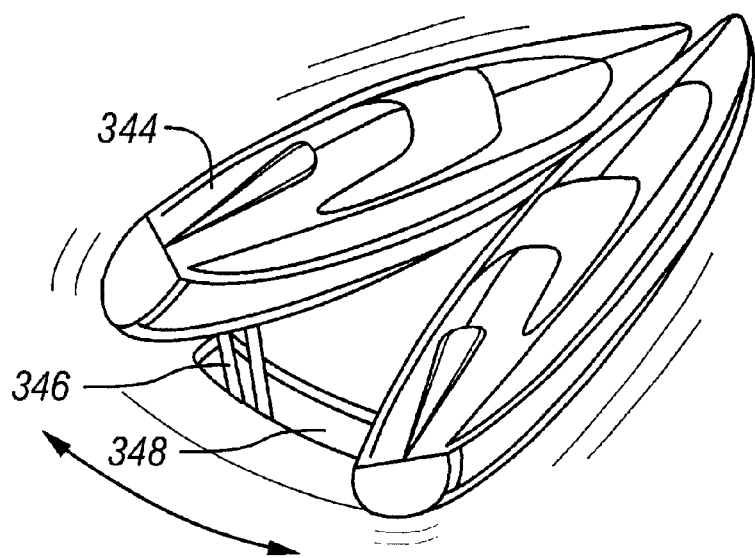
FIG. 11B
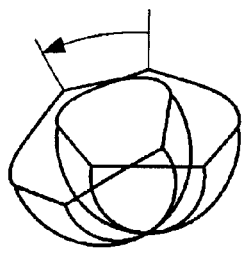 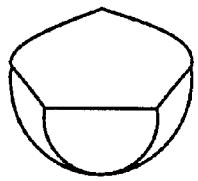 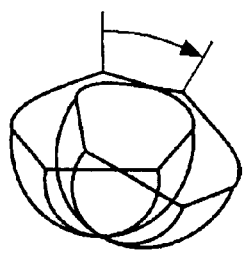
FIG. 12A　　FIG. 12B　　FIG. 12C

PORTABLE SIMULATION GAME APPARATUS

CROSS-REFERENCE TO RELATED APPLICATIONS

This application is a continuation in part application related to Rehkemper et al., U.S. patent application Ser. No. 09/631,819, entitled "Handheld Driving Simulation Game Apparatus", filed Aug. 3, 2000, and incorporated by reference herein, with priority claimed for all commonly disclosed subject matter.

FIELD OF THE INVENTION

This invention relates generally to handheld or tabletop game apparatuses and particularly to a portable game apparatus simulating racing or various other activities.

BACKGROUND OF THE INVENTION

Simulated activity games and instructional devices are well known in the art and have been developed in a variety of forms. For many years, practitioners in the entertainment, game and educational arts have employed various types of apparatuses, which utilize a scrolling display to simulate movement. Initially, displays simulating movement were developed primarily in educational devices such as driving or flying simulators and were used to teach various types of driving or flying skills. A typical driving simulator utilized a driver seat, for the student, and which supported a simulated steering wheel, an accelerator pedal and brake pedal of the type used in vehicles. A large display screen was positioned in front of the driver's seat and steering wheel. A projection system or other apparatus was employed to produce an image on the screen resembling the forward-looking view of the driver within a vehicle. Control apparatus operative in response to the steering wheel movements as well as user activation of the accelerator and brake pedals control the scrolling of the display. Thus, in a typical driving simulation, the image on the display is scrolled in response to movement of the steering wheel to depict side-to-side movement, and scrolled forwardly at speeds responsive to the accelerator and brake pedal activity. In a properly coordinated and controlled apparatus, the movement and scrolling as well as the rates of movement and scrolling are sufficiently accurate to impart a "view from the driver's seat" for the student.

Practitioners in the game arts quickly realized the potential of movement simulators for providing driving and racing games. Prior to the development of scrolled display apparatus in driving simulators and the like, early driving and racing games were very basic and often employed a roadway or track printed on a scroll or endless belt. A mechanism was provided for moving the scroll or endless belt in order to move the "roadway" printed thereon. Typically, a miniature vehicle was supported upon the scroll or endless belt and a mechanism, such as a steering wheel or the like, was operatively connected to the vehicle to move the miniature vehicle side-to-side for a steering-like activity. The basic objective was to follow the road as it moved about on the moving scroll or endless belt. An example of such scroll or endless belt type driving game is set forth in U.S. Pat. No. 4,270,306 issued to Klawitter which sets forth a toy driving simulator with brakes having a body in the form of a toy vehicle within which a selectively driven belt having a path or paths is movable. A miniature vehicle intended to be steered is connected such that it may be moved laterally with respect to the belt by manipulating a steering device. The path displaying surface of the belt and the miniature vehicle are viewable in a mirror which is generally but not necessarily in the form of an inside surface of a simulated windshield.

U.S. Pat. No. 4,212,459 issued to Wolf sets forth a racing game having movable terrain and a controlled vehicle having freedom in the vertical and horizontal planes. The movable terrain speeds are controlled by the operator and automatically reduced in response to predetermined improper operation. Obstacles are positioned on the terrain in the form of a belt, which are self-righting according to one embodiment. Other obstacles such as ramps, trees, etc. are permanently positioned upon the belt.

U.S. Pat. No. 5,346,398 issued to Nakahata, et al. sets forth a stationery game machine having a housing supporting an endless belt driven by a motor. The endless belt is positioned in a generally horizontal plane and depicts a roadway. A stationery vehicle is movable in response to user inputs and is moved side-to-side by steering wheel movements by the game player.

U.S. Pat. No. 5,794,936 issued to Kakizaki sets forth an apparatus having a small handheld housing supporting a movable endless belt upon which a roadway is depicted. The housing further supports a simulated steering wheel, which is coupled to a miniature vehicle, supported above the endless belt. As the endless belt moves, the roadway undulates and the user attempts to follow the roadway by manipulating the steering wheel. The toy vehicle is moved in response to manipulation of the steering wheel.

U.S. Pat. No. 4,231,571 issued to Watanabe sets forth a portable obstacle toy having a housing supporting a small electric drive motor and a diverter transmission. An endless belt is mounted within the housing and is capable of being continuously moved or orbiting upon the mounting member in response to the motor drive. The endless belt includes at least one obstacle on its surface. An object member is slidably mounted on the base of the housing and includes an object attached to the object member and positioned near the surface of the endless belt. As a result, the object is able to slide transversely to the direction of travel of the endless belt to avoid obstacles on the surface thereof.

U.S. Pat. No. 4,438,922 issued to Suda sets forth a toy for steering a simulated car in which cars are pictured on each of two transparent endless belts, which are moved by engagement with drums. A light source provides a light for indicating a collision when the pictured car is overlapped with the simulated car moved laterally with respect to the belt by the user in response to a simulated steering wheel.

With the development of effective display devices of the type used in driving simulators or other simulators of the like, practitioners in the game arts began employing video-based simulator games which were very similar to instructional devices. For example, U.S. Pat. No. 4,940,234 issued to Ishida, et al. sets forth a video game machine having a cockpit-like console supporting a steering wheel and other operative levers such as a gear shift and the like. The console includes a processor which produces output signals coupled to a television monitor or the like upon which a scrolling image is displayed. A toy vehicle is supported beneath the video display monitor and is movable laterally in response to control signals from the console. In combination, the user is able to manipulate the steering wheel, gearshift and other control apparatus on the console to produce corresponding movements of the toy vehicle laterally beneath the display screen and corresponding movements of the video image on the television monitor.

U.S. Pat. No. 5,203,563 issued to Loper, III sets forth a shaker control device having a driving simulation game in which the user is able to operate a steering apparatus together with a brake and gas pedal to control simulated movement appearing on a video screen. In addition, a vibrating device is positioned within the steering apparatus to produce suitable vibrations simulating the vibrations encountered in the driving activity.

U.S. Pat. No. 4,373,722 issued to Kite, et al. sets forth an electronic vehicle race simulator having a handheld unit supported by a pair of handle grips and having a plurality of display items on the front face thereof. The user is able to operate a gas or accelerator button together with a gearshift button. The game includes a motor sound device which produces engine sounds at various pitches indicative of engine RPM. A simulated staging light of the type employed in drag strip racing often referred to as a "Christmas tree" is provided on the housing face.

In addition, U.S. Pat. No. 3,588,107 issued to Kupperman, et al. sets forth a vibrating tack racing game in which the racing panel is vibrated by a motor operating a rotatable member, which engages the racing panel.

While the foregoing described prior art devices have to some extent improved the art and have in some instances enjoyed commercial success, there remains nonetheless a continuing need in the art for evermore improved, interesting, amusing and cost effective simulation game apparatus. Moreover, the need exists to expand these improved simulation game apparatus to cover simulations and racing involving a variety of vehicles, including but not limited to cars, planes, jets, motorcycles both on and off road, boats, tractors, monster trucks, etc.

SUMMARY OF THE INVENTION

The present invention describes a portable simulation game apparatus that permits a user operating the game apparatus to move or control a three dimensional object that is supported by the game apparatus. The movement or current position of the three dimensional object is sensed by a plurality of sensors and transmitted to a circuit board or a control means. The control means may then relate the movement or position of the three dimensional object to pre-programmed images displayed on a display means in front of the three dimensional object. Typically, the pre-programmed images being displayed represent a race or a track for which the three dimensional object, being a vehicle, may interact therewith. To move the three dimensional object, the user tilts or moves the game apparatus in a specific direction the user wants the object to move. For example, if the object is a car and the user wants to move the car to the left side of the game apparatus, the user tilts the apparatus to the left.

In addition, various user inputs permits the user to increase or decrease the rate in which the pre-programmed images are scrolled across the screen, providing the user with a visual indication that the three dimensional object is traveling faster or slower. If the three dimensional object includes wheels the object may also be placed on a plurality of rollers. The rollers are rotatably controlled by the control means and a motor means for which the rate of rotation is controlled by the user inputs. As such, when the user increases the scroll rate of the preprogrammed images, the speed of the rollers and thus the wheels will also increase.

Various embodiments illustrate the three dimensional object being either a land, air or water vehicle. However, it will be readily shown that the three dimensional object may be any other type of three dimensional object.

In another embodiment of the present invention the three dimensional object may be moved by increasing the speed of the rollers, which would subsequently cause the front end of the object to rise, simulating drag racing. In yet another embodiment of the present invention the three dimensional object may be moved by levers; and in yet another embodiment of the present invention the three dimensional object may be tilted forwards and backwards as well as to the left and right, simulating the pitch and roll in an air vehicle.

BRIEF DESCRIPTION OF THE DRAWINGS

A fuller understanding of the foregoing may be had by reference to the accompanying drawings, wherein:

FIG. 2b is an enlarged view of the sensor locations from FIG. 2a;

FIG. 4b is an enlarged view of the sensor locations and the piston from FIG. 4a;

FIG. 11b is a perspective view of the boat being moved from the left side to the right side of the housing;

FIG. 12 is a rear view of the three dimensional vehicle illustrating the tilting movement that may be employed;

FIG. 21b is an enlarged view of the pitch and roll mechanism from FIG. 21a; and

DESCRIPTION OF THE EMBODIMENTS

Figure 1:
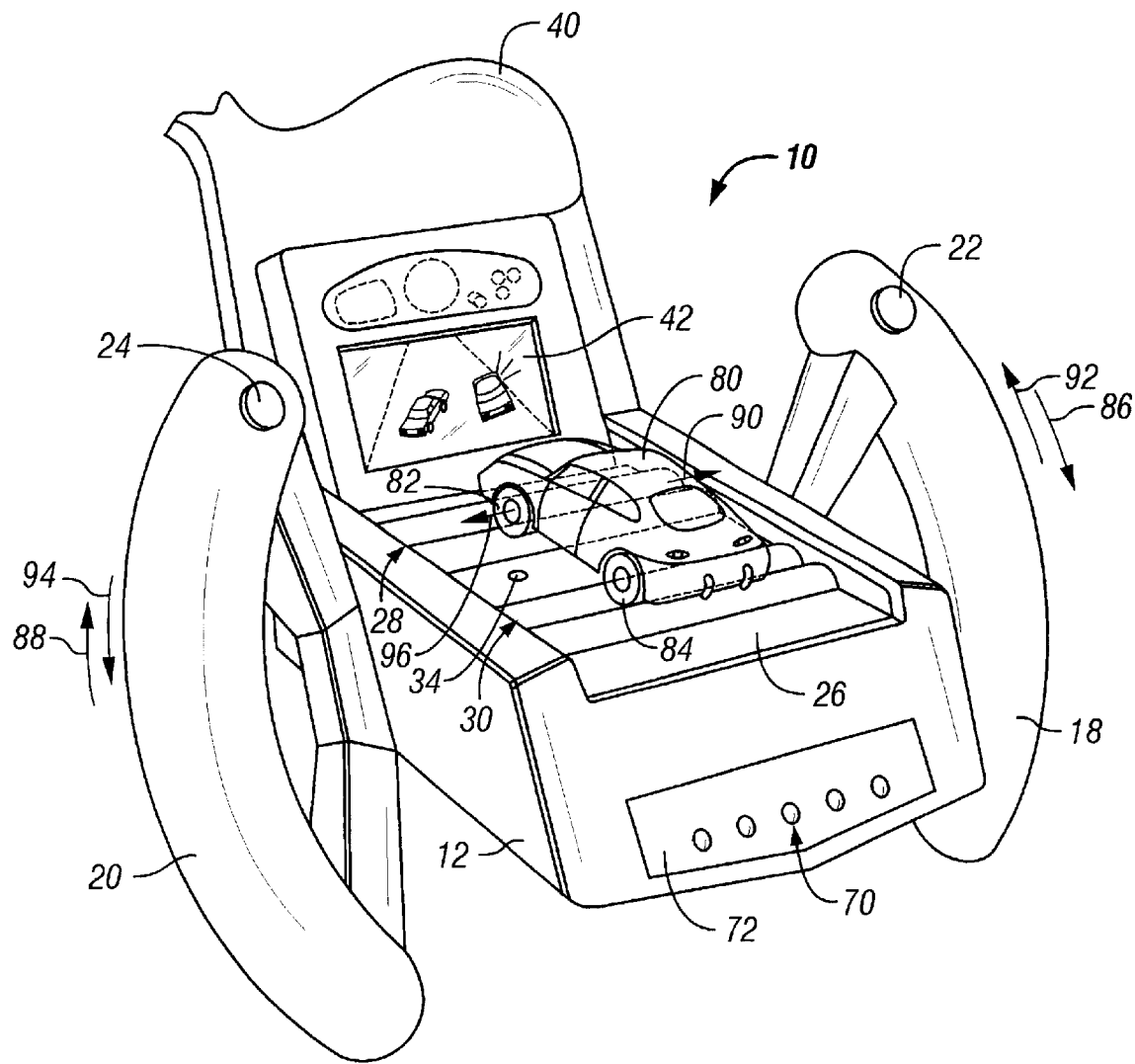
FIG. 1 is a perspective view of a portable game apparatus illustrating the incorporation of a three dimensional automobile in a driving simulation.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Generally described throughout the embodiments and illustrated herein, a game apparatus is provided that includes a means for displaying scrolling images. The images are typically associated with a racing game or activity involving vehicles. As will be shown and described herein, the term "vehicle" is utilized to generally describe any type of land vehicle (i.e. a motorcycle, car, racecar, truck, bicycle, etc.); water vehicle (i.e. boat, skis, jet ski, submarine, etc.); or air vehicle (i.e. airplane, jet, fighter, glider, space ship, etc.). The displaying means scrolls the images towards or away from the user, providing the user with the visualization that they are interacting in a race or event. The game apparatus further includes the means to increase or decrease the speed of the scrolling images. Rather then typical games that place the player's vehicle as one of the displayed images, the user is provided with a real three dimensional object that is similarly configured to one of the imaged vehicles displayed in the game.

The player is further capable of moving the three dimensional vehicle in order to interact with the displayed scrolling images. The movement of the three dimensional vehicle will depend upon the type of vehicle. For instance, if the vehicle is a motorcycle, the player may increase or decrease the speed of the motorcycle, lean the vehicle to the left or right, and/or lift the front end of the bicycle to perform "wheelies." However, if the vehicle is a car, the user may only be able to move the car to the left or right, and control the speed of the car.

To determine the position and change in position (or movement) of the vehicle, sensors strategically supported by the game apparatus may sense the position or movement of the three dimensional vehicle and transmit such to electronics, which control the images on the display means. It is important to note that the three dimensional vehicle is not imaged on the display means with its movements simply mimicked, rather the three dimensional vehicle interacts with the display means such that the electronics can determine the position of the three dimensional vehicle in relation to the images on the display means. For exemplification purposes only, if the three dimensional vehicle is a motorcycle, the electronics may control the scrolling rate in response to the player's increase or decrease in speed, and as such will adjust the images on the display in accordance therewith. As such, if the images on the display illustrate a motorcycle positioned in the middle of a racetrack traveling slower than the three dimensional motorcycle (or scrolling towards the player), the player leaning the three dimensional motorcycle to the left or right, would be able to pass the motorcycle on the left or right respectively. The images of the display would not necessarily shift to the left or right when the player leaned the three dimensional motorcycle, but the electronics would sense and relate the movement such that the player would be able to pass the imaged motorcycle, such that the image would scroll down off the screen, permitting the player to continue the game. If the player did not lean or slow the three dimensional motorcycle, the electronics sensing no responsive movement would adjust the image to display the imaged motorcycle as if it was being crashed into from behind by the three dimensional motorcycle.

In accordance therewith, the specific embodiments of the present invention along with other examples will now be described in greater detail.

Figure 2A:
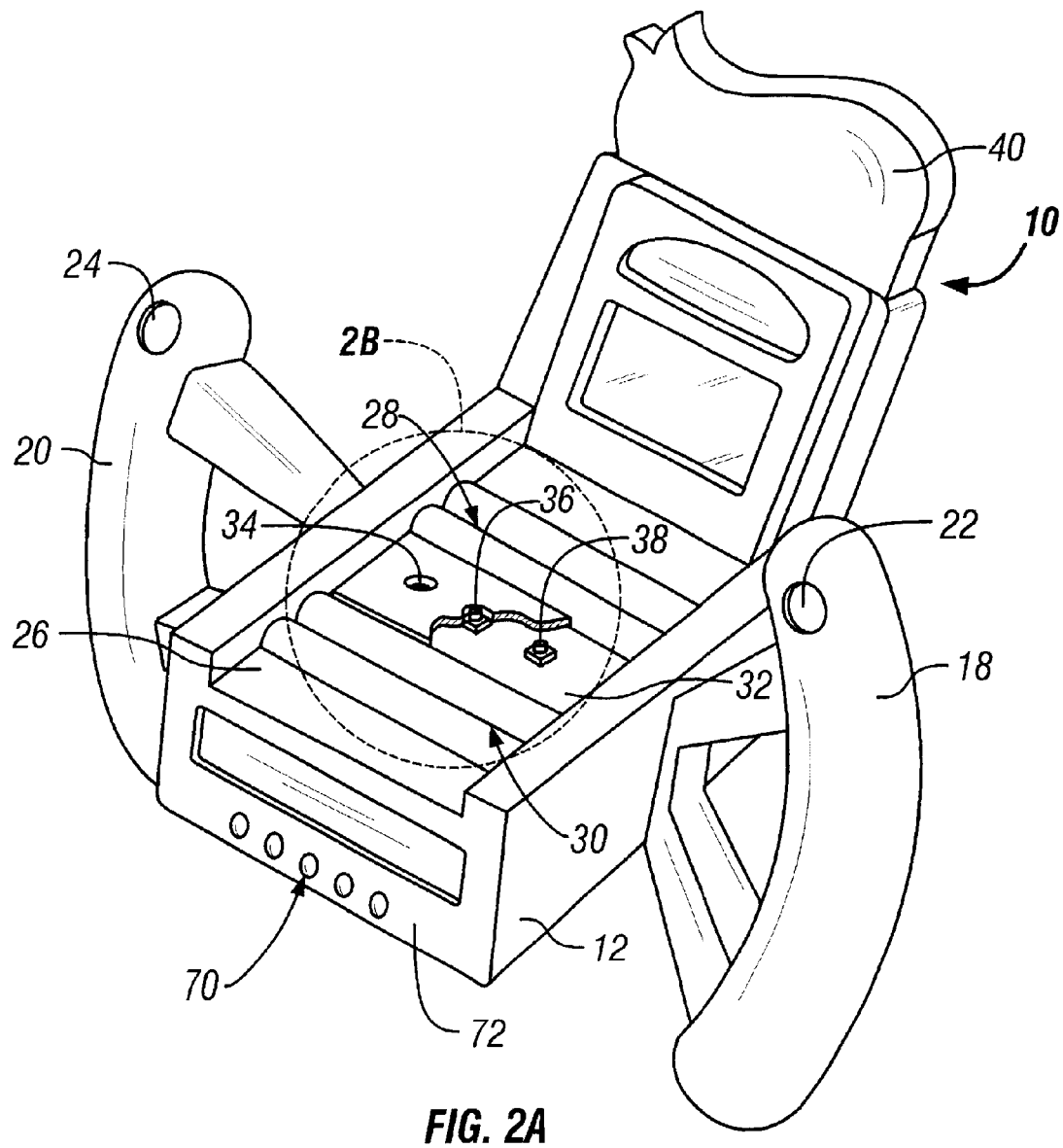
FIG. 2a is a perspective view of the game apparatus from FIG. 1 showing the sensors that are supported by the vehicle bed.
Figure 2B:
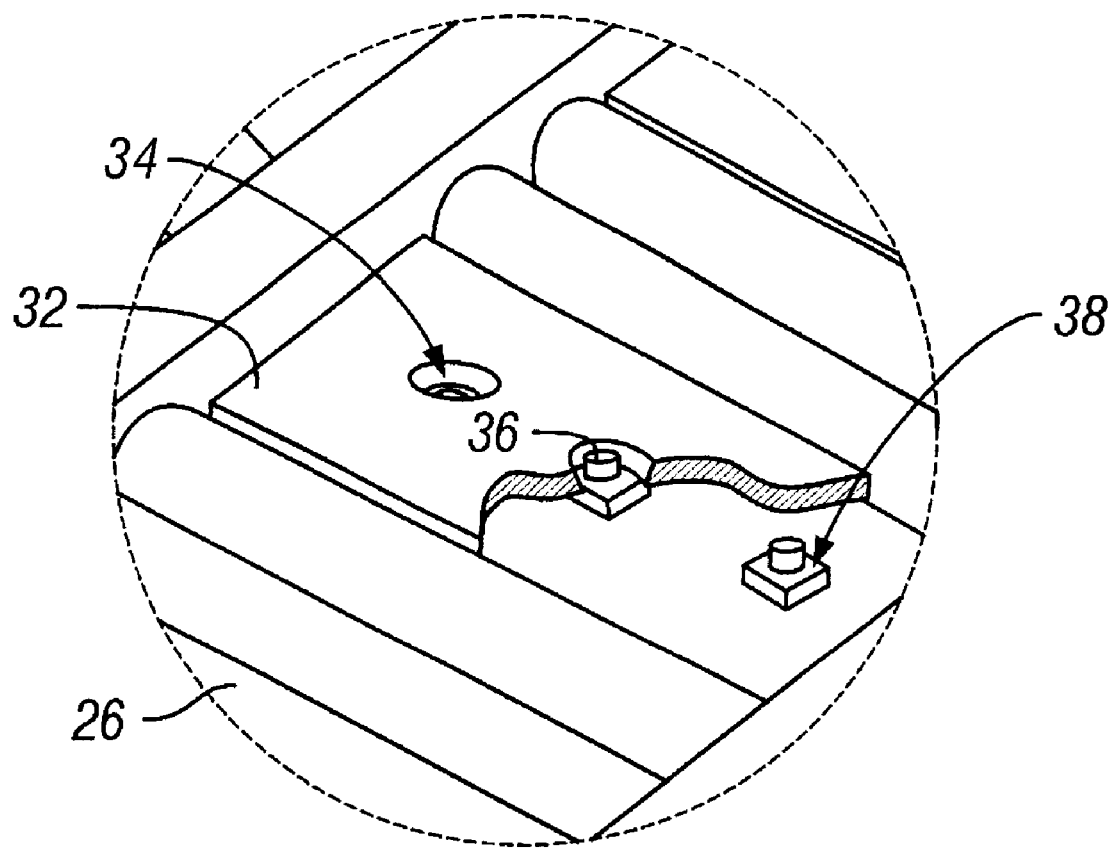
Figure 3:
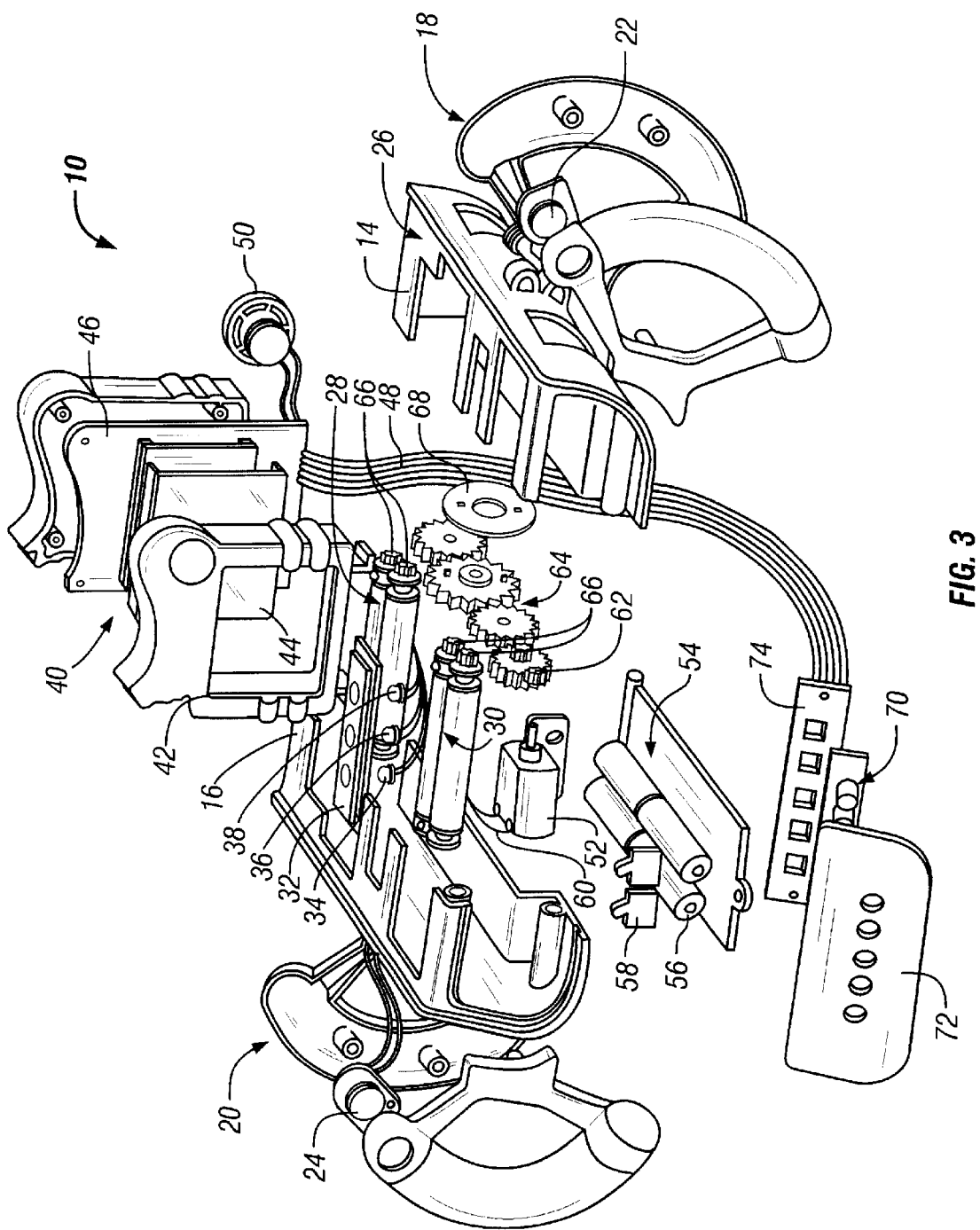
FIG. 3 is an exploded view of the portable game apparatus from FIG. 1.
Figure 4A:
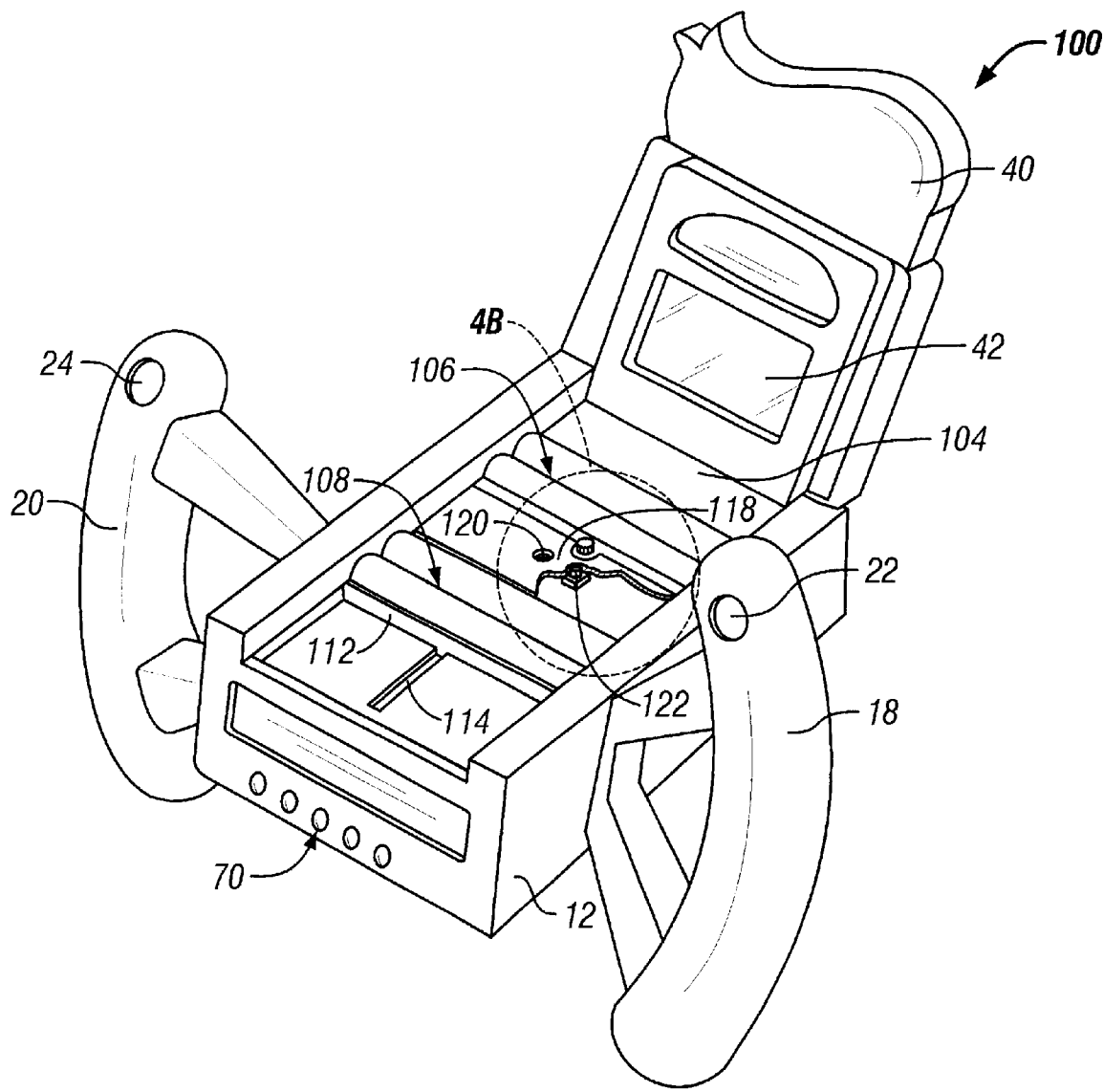
FIG. 4a is a perspective view of another embodiment of a portable game apparatus that includes a moving vehicle bed for accompanying various sized vehicles as well as including a piston for raising and lowering the front end of a vehicle.
Figure 4B:
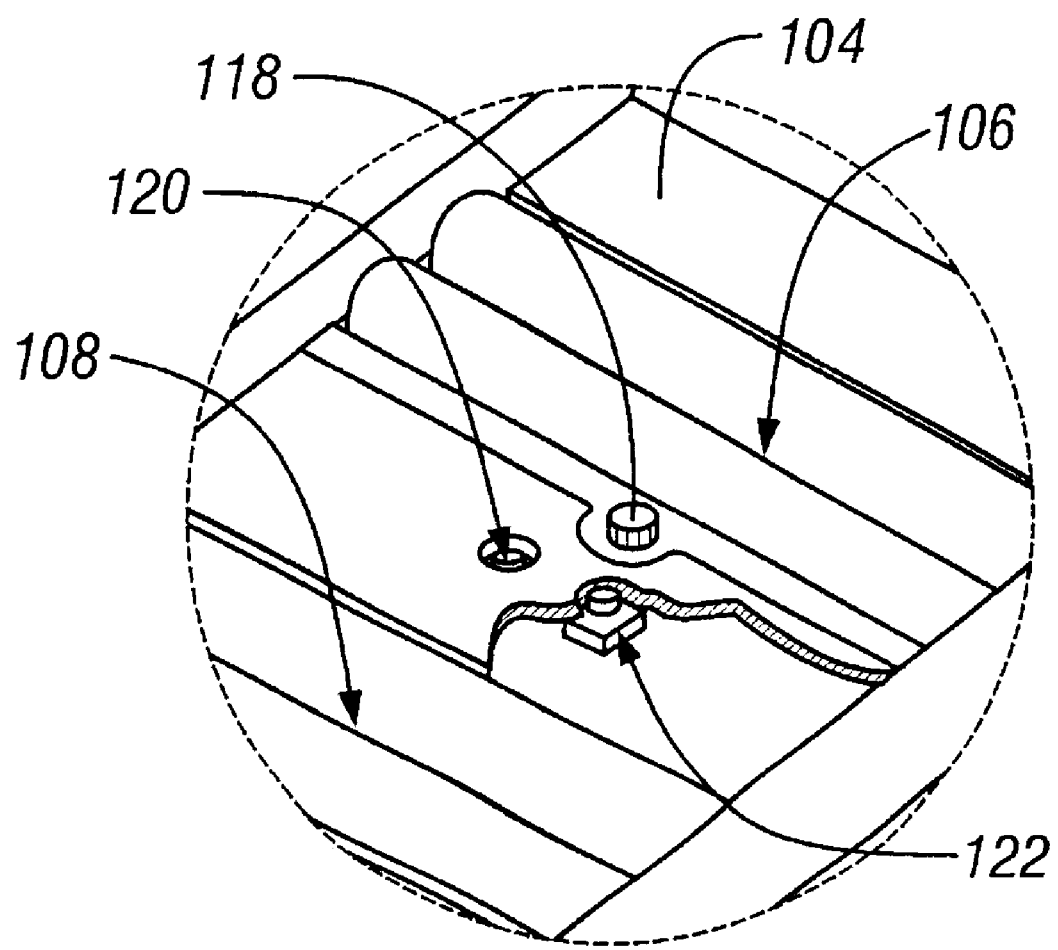
Figure 5A:
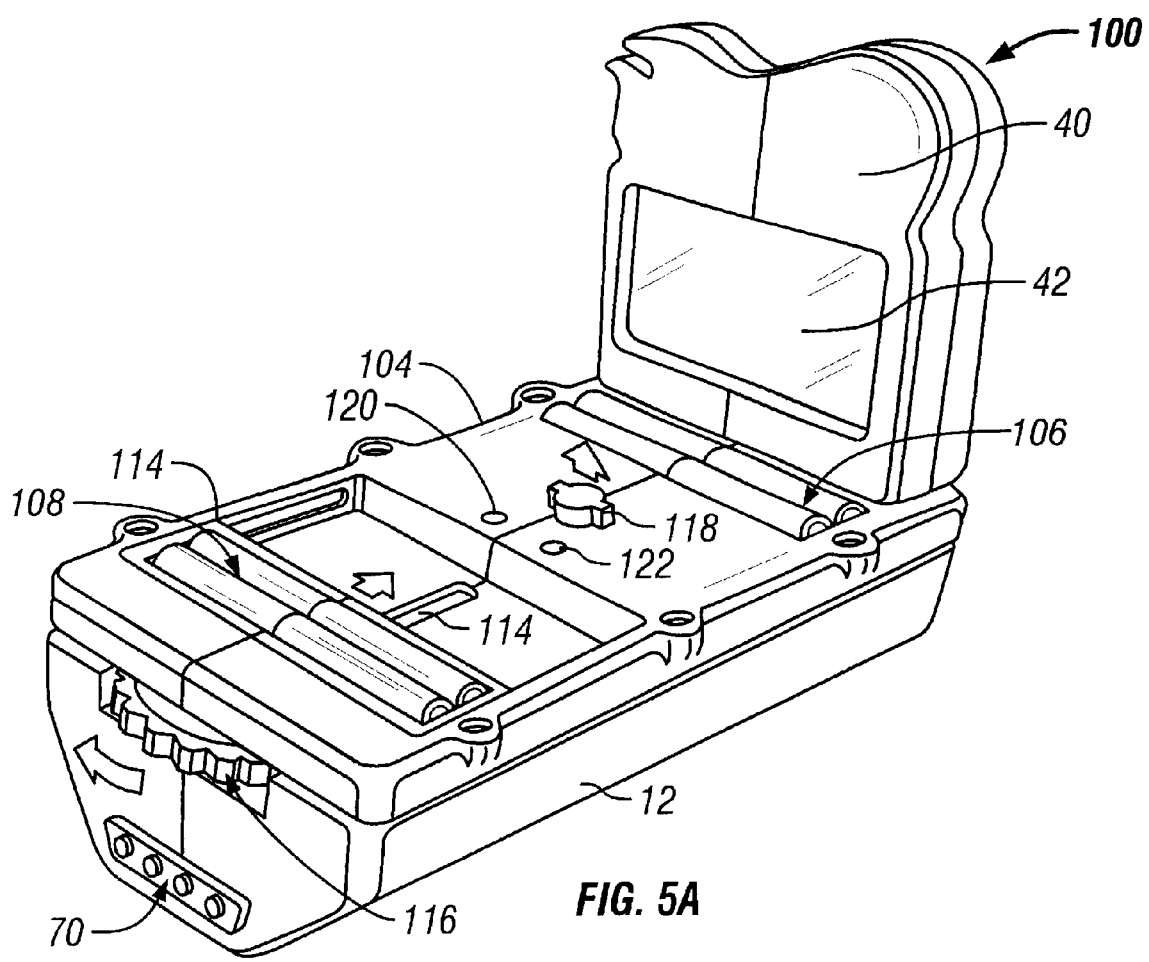
FIG. 5a is a perspective view of the portable game apparatus from FIG. 4a, illustrating the movable vehicle bed.
Figure 5B:
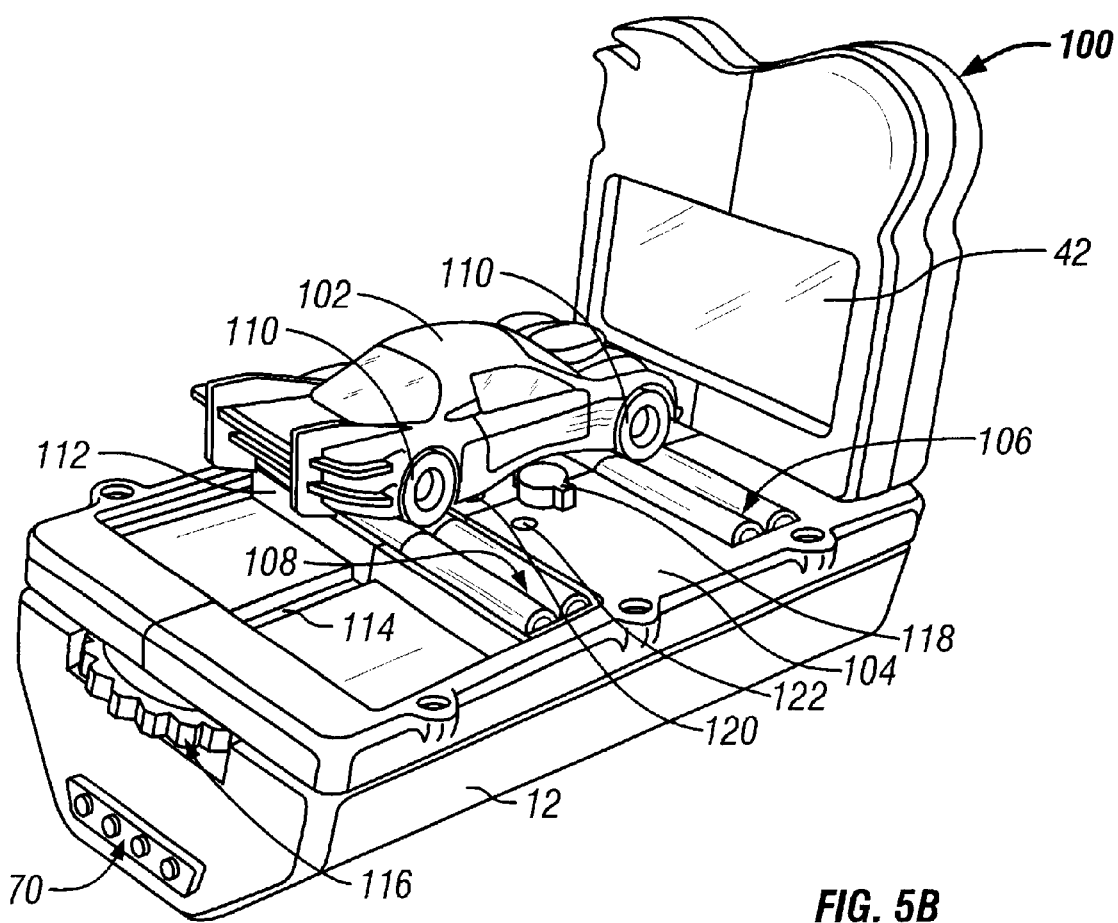
FIG. 5b is a perspective view of the portable game apparatus from FIG. 4a with a vehicle placed upon the adjustable vehicle bed.

Referring now to FIGS. 1 through 3, a game apparatus constructed in accordance with the present invention is generally referenced by numeral 10. The game apparatus 10 includes a housing 12 that is defined by two pieces 14 and 16 (more clearly illustrated in FIG. 3) that enclose various components, described in greater detail below. The housing 12 supports a pair of steering wheel handles 18 and 20, which separately support an accelerator button 22 and a brake button 24 respectively. The housing 12 further includes a vehicle bed 26 that supports a plurality of rollers, which include a pair of front rollers 28 and a pair of rear rollers 30. The vehicle bed further supports a sensor retainer 32, which attaches a plurality of optical sensors thereto, mainly, a left sensor 34, a center sensor 36, and a right sensor 38 (FIGS. 2a and 2b).

The game apparatus 10 further includes a display housing 40. The display housing 40 includes a display screen 42 and a liquid crystal display array 44. A circuit board 46 or control means secured behind the liquid crystal display array 44, controls the images displayed on the display screen 42. A plurality of coupling wires 48 operatively connects the circuit board 46, the liquid crystal display array 44 and other electronics, for example, the accelerator button 22 and brake button 24, to each other. The circuit board 46 further includes a sound circuit operatively coupled thereto. The sound circuit converts digitally encoded signals to appropriate analog audio signals suitable for driving a conventional speaker 50.

The housing 12 also includes an interior that supports a motor 52 that is coupled to a power source 54, FIG. 3. The power source 54 is typically a battery power 56 with contacts 58 that are connected to the motor by the wires 60. The motor 52 includes a transfer gear 62 meshed to a series of gears 64. Each roller, of the front and rear rollers 28 and 30, support an end gear 66 that engages a gear from the series of gears 64. The function of the aforementioned gears is to provide rotational power to rollers. One of the gears in the series of gears 64 is also attached to a flywheel washer 68 such that the flywheel washer 68 gains inertia when the series of gears 64 rotate. When the motor 52 stops, the inertia of the flywheel washer 68 provides additional rotation to the rollers.

The housing 12 further supports a plurality of operation buttons 70 that are accessible through a front plate 72. The operation buttons 70 are connected to the circuit board 50 by the wires 48. The operation buttons 70 control various predefined gaming options on the circuit board 46.

In further accordance with the present invention, a three dimensional vehicle 80 is provided with a front and rear set of rotatable wheels 82 and 84, respectively, which are received upon the pair of front rollers and pair of rear rollers 28 and 30 respectively.

In operation, the user presses one of the operational buttons 70, which starts the operation of the game apparatus 10. Gripping the handles 18 and 20, the user may position a thumb over the accelerator button 22 and the brake button 24. The circuit board 46 begins the programming to produce various images on the display screen 42 and emit various sounds through the speaker 50 to emulate a pre-programmed gaming mode, for instance a race. The images on the display screen 42 may include other cars, obstacles, a racetrack or road.

Using the accelerator button 22 and the brake button 24, the user is capable of controlling the speed of the scrolling images. The accelerator button 22 and the brake button 24 are operatively connected to the circuit board 46, such that the users interacting with them causes the scrolling images to change accordingly. In addition, the circuit board 46 upon receiving inputs from the accelerator button 22 and the brake button 24 controls the motor 52.

The motor 52, as mentioned above, rotates of the series of gears 64 that are in communication with the rollers 28 and 30, which are in further communication with the wheels 82 and 84 of the three dimensional vehicle 80. As such, in response to the user's inputs, the gears produce corresponding rotations in the pair of rollers 28 and 30, causing the wheels 82 and 84 of the three dimensional vehicle 80 to spin. It is important to note that the front rollers 28 rotate in a front-to-rear direction, while the rear rollers 30 rotate in an opposite or rear-to-front direction, causing the front wheels 82 to rotate forwards, and the rear wheels 84 to rotate backwards. As a result, even though the wheels of the three dimensional vehicle 80 are rotating along with the rollers, the three dimensional vehicle 80 is maintained in place by opposite rotation of its wheels. It is also important to note that the front rollers and the rear rollers rotate at the same speed otherwise the vehicle 80 would be propelled off of the vehicle bed 26. However it is contemplated by the present invention that the rollers rotate in the same forward direction, causing all the wheels of the three dimensional vehicle 80 to rotate in the forward direction. In such embodiments, the vehicle 80 would be secured to the vehicle bed 26 preventing it from being propelled off of the vehicle bed 26.

By pressing accelerator button 22 or the brake button 24 the user is able to increase or decrease the speed of the three dimensional vehicle 80 upon the rollers. More importantly, the, accelerator button 22 and the brake button 24 indicate to the circuit board 46 the speed of the three dimensional vehicle 80 in relation to the images on the display screen 42 such that the circuit board 46 can increase and decrease the rate and direction of the scrolling images in speeds responsive to the speed of the three dimensional vehicle 80. If the speed of the three dimensional vehicle 80 is faster then the images on the display screen 42 then the circuit board 46 scrolls the images towards the bottom of the display screen 42. Alternatively, if the three dimensional vehicle 80 is slower then the scrolling images, the images on the display screen 42 scroll towards the top of the display screen 42 or away from the three dimensional vehicle 80.

In further accordance with the present invention as the user pivots the game apparatus 10 in a simulated steering motion, the three dimensional vehicle 80 slides towards the low side of the turn. Thus, in the event the user steers game apparatus 10 into a right turn by pivoting the right handle 18 downwardly in the direction indicated by arrow 86 (FIG. 1) while pivoting the left handle 20 upwardly in the direction indicated by arrow 88, the three dimensional vehicle 80 slides to the right upon the rollers 28 and 30 in the direction indicated by arrow 90. Conversely, when the user executes a left turn movement by raising the right handle 18 in the direction indicated by arrow 92 and lowering the left handle 20 in the direction indicated by arrow 94, the three dimensional vehicle 80 slides upon the rollers in the direction indicated by arrow 96. Accordingly, the user is able to execute turning and steering movements by pivoting the handles 18 and 20 which in turn causes the three dimensional vehicle 80 to move in the direction toward which a turn has been executed. In accordance with an important aspect of the present invention, the lateral movement or position of the three dimensional vehicle 80 upon the vehicle bed 26 is communicated to the circuit board 46 through optical sensors 34, 36 and 38.

In the manner set forth below the optical sensors 34, 36 and 38, best shown in FIGS. 2a and 2b, communicate the lateral position of the three dimensional vehicle 80 to the circuit board 46 of the game apparatus 10. When the above-described right turn steering movement of the handles 18 and 20 is executed, causing the three dimensional vehicle 80 to move to the right in the direction indicated by arrow 90, the three dimensional vehicle 80 travels over the optical sensors 34, 36 and 38, from the left-to-right. The optical sensors communicate the movement to the circuit board 46. As such, if the three dimensional vehicle 80 is on the left side over optical sensor 34 and the user executes a right turn, the three dimensional vehicle 80 travels over optical sensor 36 and comes to a rest over 38. The circuit board 46 receiving signals from the sensors in relation to this relative movement of the three dimensional vehicle 80 can then determine the position of the three dimensional vehicle 80 in relation to the displayed images. Rather then mimicking the movements of the three dimensional vehicle 80 on the display screen 42, the circuit board 46 can determine the position of the three dimensional vehicle 80 laterally in relation to the images on the display screen. For exemplification purposes only, if an image on the display screen was another vehicle scrolling towards the bottom of the screen (or traveling slower then the three dimensional vehicle 80) the user may steer the three dimensional vehicle away from the image. If the image travels directly in front of the lateral position of the three dimensional vehicle 80, the circuit board 46, determining that the lateral position of the three dimensional vehicle 80 is at the same position as the image, the circuit board 46 plays images and sounds indicative of a crash. The placement of the sensors 34, 36 and 38 allow the circuit board to determine a total of five lateral positions, one position over each sensor and two positions in between two sensors. Thus, it is apparent to those skilled in the art that different vehicle sizes and numbers of sensors supported by the vehicle bed 26 may be employed to change the number of vehicle positions capable of being determined.

In accordance with the operation, the circuit board 46 produces appropriate sounds to accompany the operation and operational status of three dimensional vehicle 80. Thus, it will be noted that pressing accelerator button 22 and increasing the roller speed of the rollers 28 and 30 preferably causes the circuit board 46 to produce higher pitch engine sounds characteristic of increased acceleration. Conversely, pressing brake button 24 preferably causes the production of screeching or braking sounds to further enhance realistic conditions.

Referring now to FIGS. 4a through 5b, in another embodiment of the present invention a game apparatus 100 is shown and similarly configured to the game apparatus 10 in the previous embodiment. The game apparatus 100 includes handles 18 and 20 that separately support an accelerator and brake button 22 and 24 that are operatively connected to a control means or circuit board. A plurality of operation buttons 70 positioned in the front of the game apparatus 100 is utilized to set various gaming functions, options and modes. A three dimensional vehicle 102 (FIG. 5b) is further positioned on a vehicle bed 104, which is supported by the game apparatus 100. The vehicle bed 104 further supports pairs of front and rear rollers 106 and 108, respectively, which are in communication with the wheels 110 of the three dimensional vehicle 110 such that the rollers rotate the wheels 110 in the manner described above. The game apparatus 100 further supports a display screen 42.

The vehicle bed 104, however, further supports a movable section 112 that moves forwards and backwards along a track 114 positioned in the housing 12. The movable section 112 provides the ability to change the distance between the front rollers 106 and the rear rollers 108, shown in FIGS. 5a and 5b, in order to accommodate various wheelbases, distance between the front and rear wheels. For instance, a three dimensional vehicle representative of a "top fuel car" (not shown) has a longer wheelbase then the three dimensional vehicle 102 shown in FIG. 5b, which is illustrative of a "funny car/pro stock car." As such a top fuel car would require a larger distance between the rollers. The movable section 112 is preferably operably connected to a knob 116 (FIGS. 5a and 5b) located in the front portion of the game apparatus, which when turned, slides the movable section 112 forwards or backwards along the track 114. Alternatively, the moveable section 112 may include detents (not shown), which temporarily lock the movable section 112 into a predetermined position that is sized to accommodate a predetermined wheelbase of a vehicle.

In addition, rather then having a typical racing simulation around a track or road, the game apparatus 100, illustrated in FIGS. 4a through 5b, may simulate drag racing, which during real drag racing the front end of the vehicle typically lifts during the start of the race. In order to simulate the lifting of the front end of the three dimensional vehicle 102, the vehicle bed 104 supports a piston 118 that moves up and down, providing the ability to lift the front wheels of the three dimensional vehicle off of the front rollers 106, emulating a wheelie. When the user accelerates the three dimensional vehicle at the beginning of the race, the circuit board (not shown) will, through well-known electronics, raise the piston 118 causing it to lift the front end of the three dimensional vehicle off of the front rollers. Alternatively, the accelerator button 22 may control the piston 118 such that the user by pressing the accelerator button 22 consistently causes the piston 118 to rise. When the user reduces the speed or after a predetermined time, the piston 118 will accordingly lower such that the front wheels 110 return to the front rollers 106.

As is also tantamount with real drag racing the vehicles do not change lanes and must be kept in the center of a race lane or the vehicle will crash into the sidewalls. In order to emulate this aspect of drag racing, the game apparatus includes a left sensor 120 and a right sensor 122 supported by the vehicle bed 104 on the left and right side of the game apparatus 100. The sensors communicate to the circuitry the lateral position of the three dimensional vehicle. The circuitry may then determine the position of the three dimensional vehicle in relation to the graphics being displayed on the screen. When the vehicle 102 is in the center of the vehicle bed 104, it covers both the left and right sensors 120 and 122. As such when the circuitry receives an indication that both sensors are being covered it can determine that the vehicle 102 is in the center of the racing lane. If the user tilts the game apparatus 100 to one side, the vehicle 102 may slide to one side of the vehicle bed 104 causing one of the sensors to become uncovered. The circuitry would receive such indication from the sensors and determine that the vehicle 102 is moving to one side, possible into a sidewall or the other lane. If the user does not correct the tilt by repositioning the vehicle 110 in the center of the vehicle bed 112, the circuitry may emulate the vehicle 102 crashing into the sidewall by changing the displayed images or emanating different sounds.

Figure 6A:
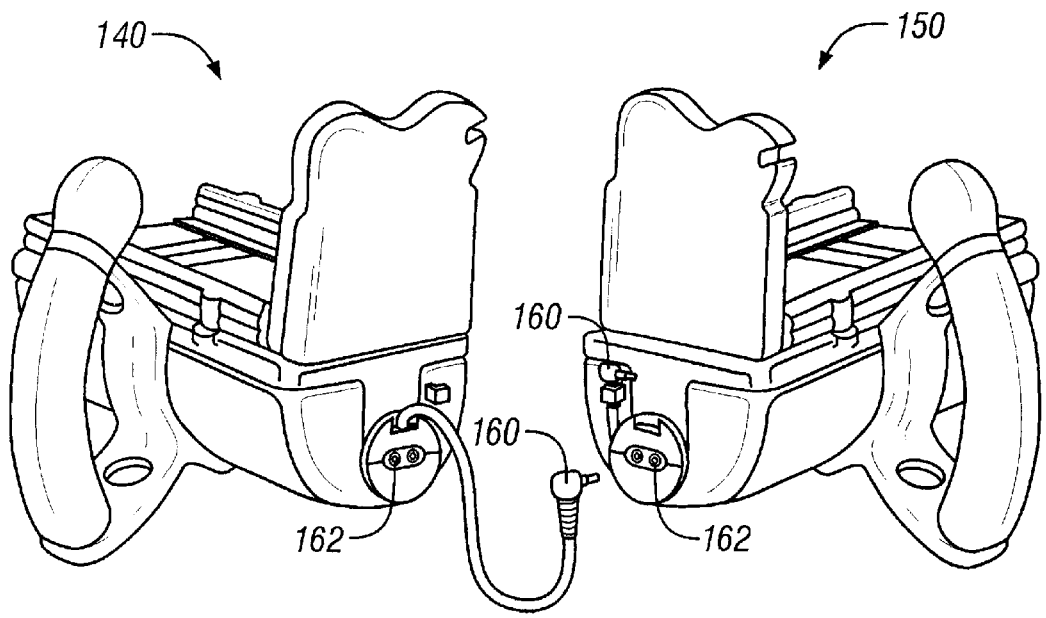
FIG. 6a is a rear perspective view of two portable game apparatuses that include the means for linking the two game apparatuses together, via a cord link.
Figure 6B:
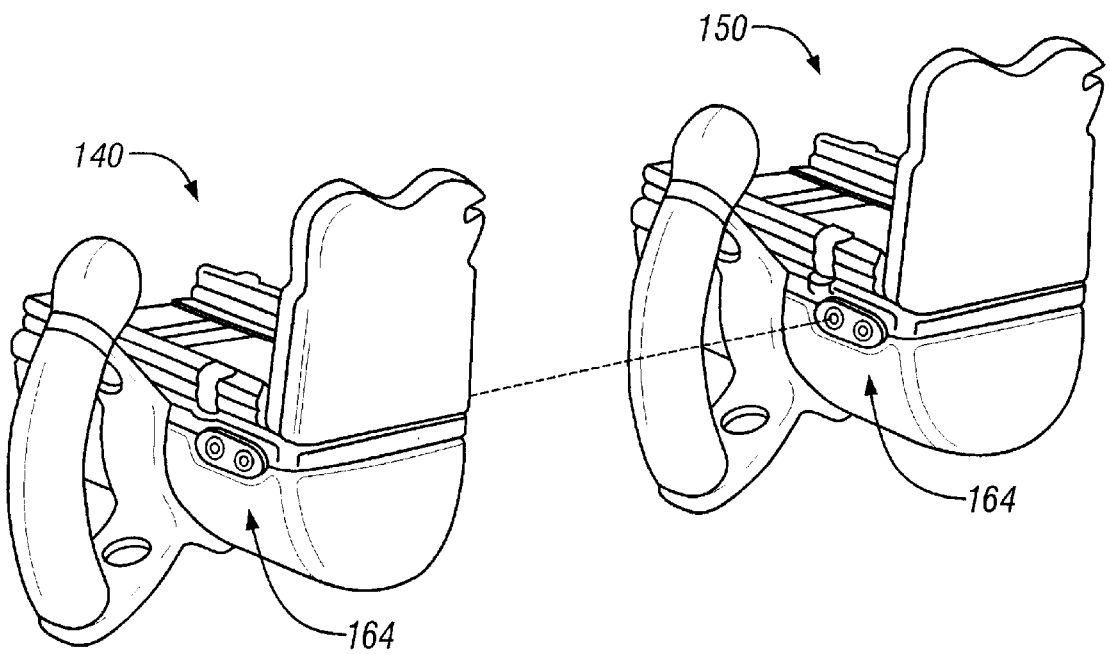
FIG. 6b is a rear perspective view of two portable game apparatuses that include another means for linking the two together, via IR transmitters and receivers.
Figure 7:
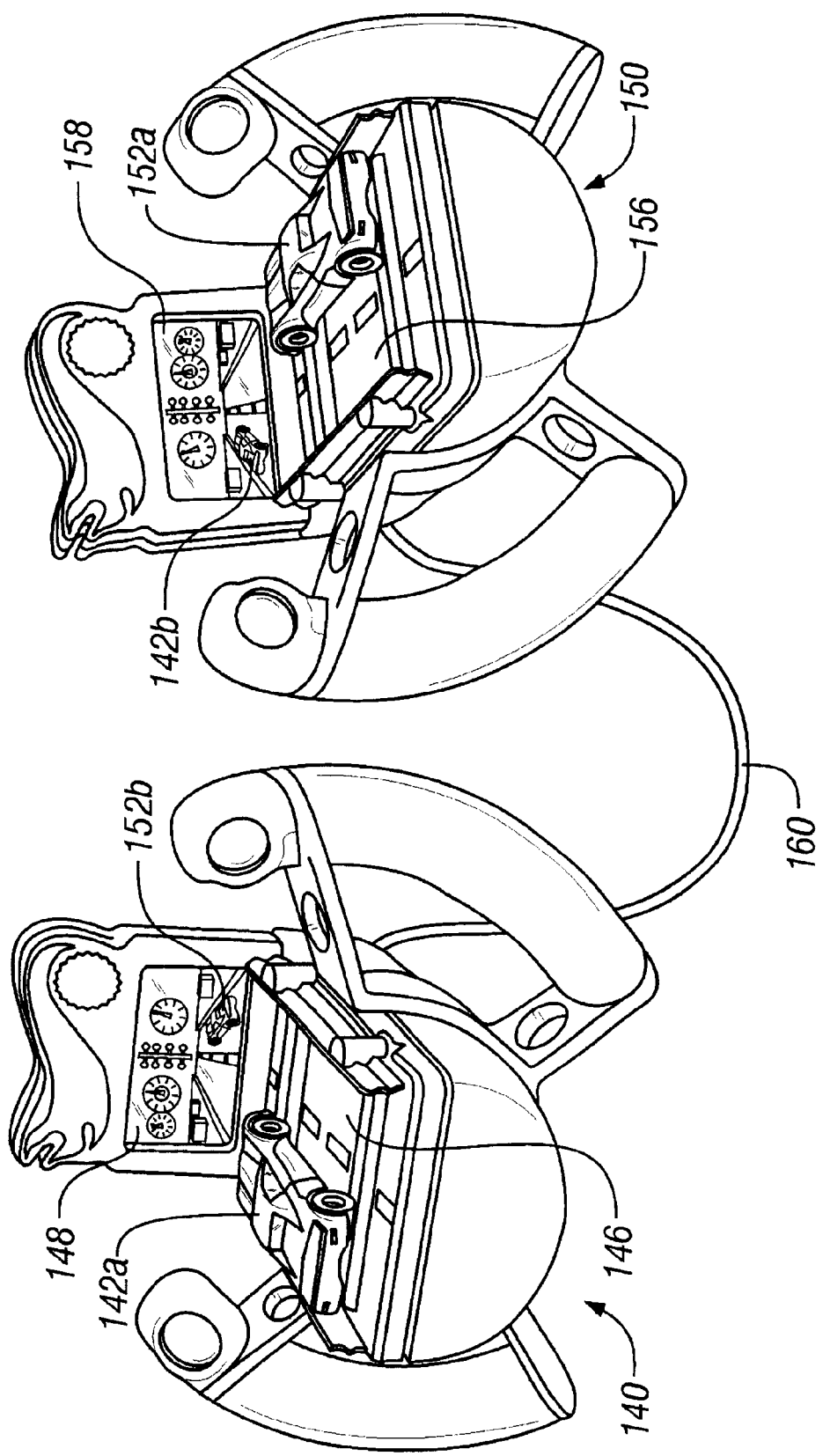
FIG. 7 is a front perspective view of FIG. 6a showing the two portable game apparatuses linked together.

Referring now to FIGS. 6a through 7, the game apparatus 100 or any of the other game apparatuses refereed to herein may also be capable of single or multi player modes. In a single player mode, the user would race or play against the "computer" (images of other cars or vehicles specifically pre-programmed to challenge the user). However, the game apparatus may also be attached to a second game apparatus, similarly configured, such that the users of each game apparatus may race against each other. Illustrated in FIG. 6a, there is shown a first and second game apparatus 140 and 150, respectively, each with a three dimensional vehicle (not shown). While any well known means for linking and communicating the relative information between multiple devices may be used, the present invention utilizes either a communication cord or infrared transmission/reception. In FIG. 6a, each game apparatus includes a communication cord 160 that plugs into a slot 162 in the other game apparatus, or alternatively in FIG. 6b, each game apparatus includes a IR transmitter and receiver 164, wherein when the game apparatuses are within a certain distance to each other, the IR transmitters and receivers 164 maintain a communication link to transfer and receive necessary information.

As mentioned previously, the electronics read information in relation to the three dimensional vehicle, for instance the speed during the race, which is controlled by the accelerator and brake buttons, the time in which the three dimensional vehicle began acceleration from the start of the race. Additional information may also be read by sensors, such as the position of the vehicle in relation to the displayed race track images.. This information received by the game apparatus' circuit board may be transmitted to the other game apparatus, which when received may display in real time an image of the opposing vehicle on its own display means.

Referring now to FIG. 7, the first game apparatus 140, which has a first three dimensional vehicle 142a and a display means 148, is linked by a communication cord 160 to the second game apparatus 150, which has a second three dimensional vehicle 152a and a display means 158. Since the two game apparatus are linked, the users may race against each other. At the beginning of each race, each display means 148 and 158 would display the road, as it would be seen through the individual game apparatus. Moreover, the displays may not show an image of the opposing vehicle if the two vehicles are starting at the same position side by side. Once the race begins, the sensors and accelerator and brake buttons of the first game apparatus 140 relate the relative speed and position of the first three dimensional vehicle 142a to the circuit board. As mentioned above, this information is received and transmitted to the second game apparatus 150, which is similarly receiving and transmitting information in relation to a second three dimensional vehicle 152a. Simultaneously, both game apparatuses determine the relative position of the two three dimensional vehicles in relation to each other and the images displayed on the screen. If one of the vehicles, for example, the second three dimensional vehicle 152a, is traveling relatively faster than the first three dimensional vehicle 142a, an image of the second vehicle 152b would appear on the first display means 148, shown in FIG. 7. This indicates to the first player operating the first game apparatus 140 that the other player is ahead of them in the race. At the end of the race, the two game apparatus can further display statistics of both players. It is also contemplated by the present invention that more then two similarly configured game apparatus may be capable of linking together at the same time.

Figure 8:
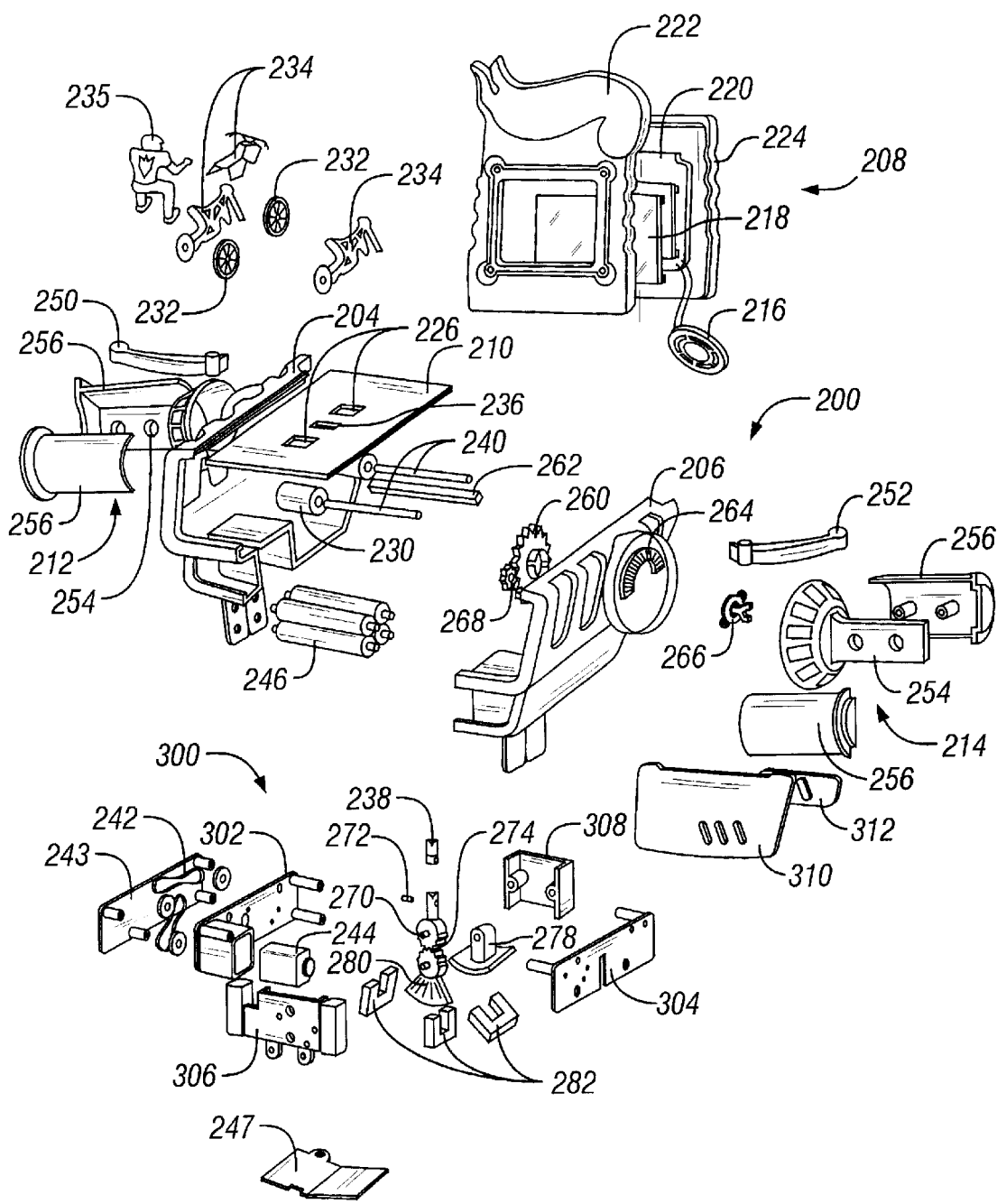
FIG. 8 is an exploded view of another game apparatus using a three-dimensional motorcycle.
Figure 9A:
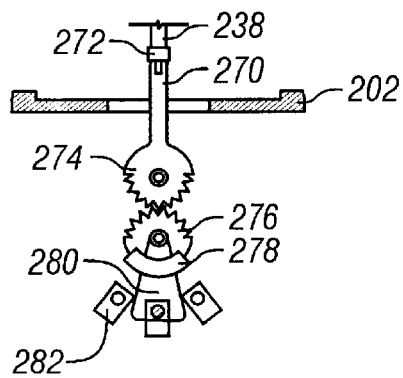
FIGS. 9a–9e illustrate the attachment means and sensor arrangements used to register the position of the motorcycle, when the game apparatus illustrated in FIG. 8 is tilted to the right or left.
Figure 9B:
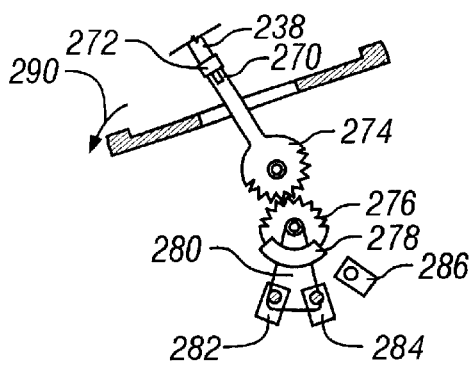
Figure 9C:
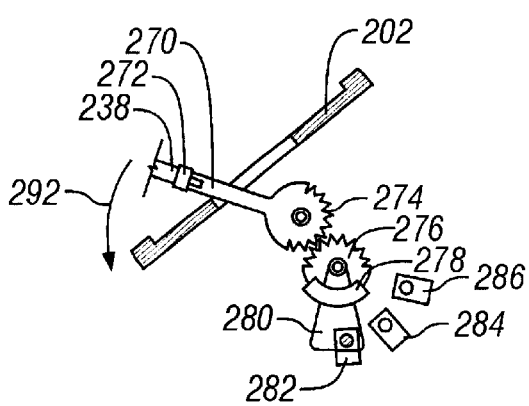
Figure 9D:
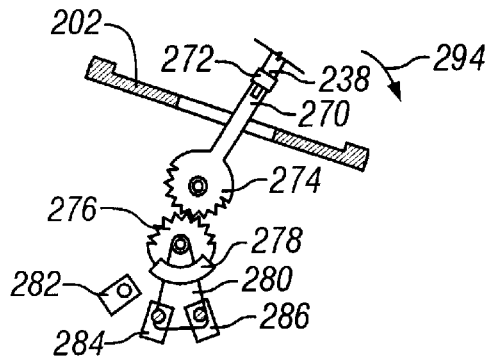
Figure 9E:
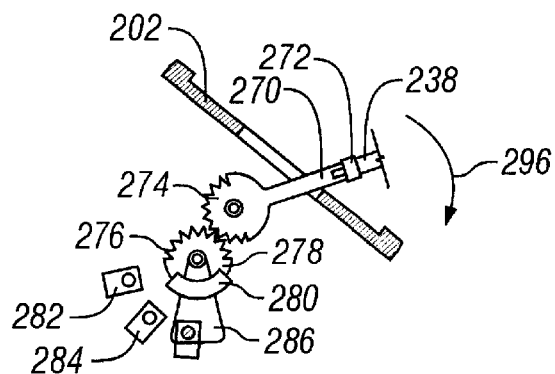

Referring now to FIGS. 8 through 9e, another embodiment of the portable game apparatus constructed in accordance with the present invention is generally referenced by numeral 200. As illustrated in its exploded view, FIG. 8, the game apparatus 200 includes a housing 202 that is defined by a left and right housing 204 and 206. When assembled the housing 202 supports a display means 208, a vehicle bed 210 and left and right handles 212 and 214, respectively. As similarly described above, the display means 208 includes a speaker unit 216, an LCD display 218 and a circuit board 220, all of which are housed within a front and rear display cover 222 and 224.

The vehicle bed 210 includes a plurality of openings 226, which support and receive a plurality of rollers 230. The plurality of rollers 230 engage and rotate the wheels 232 of the three-dimensional vehicle, which is represented by a motorcycle 234 and rider 235. The motorcycle 234 is attached, through an aperture 236 in the vehicle bed 210, to an attachment post 238 that secures the motorcycle 234 to the game apparatus 200, discussed in greater detail below. When the motorcycle 234 is attached to the game apparatus 200, the front and rear wheels 232 rest upon the rollers 230 such that when the rollers rotate the wheels rotate accordingly. Each roller 230 is attached to axle 240 that is rotated by a series of gears and pulleys 242, which are attached to a pulley chassis 243 and meshed to a motor 244. The motor 244 is powered by a battery pack 246 and controlled by the circuit board 220. The battery pack 246 may be accessed through a battery door 247 located on the bottom portion of the housing 202.

The acceleration and deceleration of the rollers 230 is controlled by the circuit board 220 through the use of the handlebars and levers. Synonymous with a real motorcycle, the throttle or acceleration is controlled by turning or rotating the right handlebar 214, deceleration or the brake is controlled by squeezing the right lever 252 and shifting gears is accomplished by squeezing the left lever 250. Both the left 212 and right handlebar 214 is defined by an inner grip 254 enclosed within a two-piece grip 256. The right handlebar 214, however, includes means that permits it to rotate and means to communicate the rotation to the circuit board, such that the acceleration of the rollers may be adjusted in response thereto.

The means to rotate the right handlebar 214 is accomplished by securing the right handlebar 214 to a gear 260 that is secured to an axle 262, which is supported by the housing 202. Positioned between the right handlebar 214 and the right side of the housing 206, is a wiper board 264 and a wiper switch 266. The wiper board 264 is affixed to the right housing 206 and in communication with the circuit board 220, while the wiper switch 266 is attached to the handlebar 214. When assembled, the turning of the right handlebar 214 is communicated to the circuit board 220, which may alter the rotational speed of the rollers 230, as well as change the speed of the scrolling display such that it appears that the images are responsive to the speed of the motorcycle 234. In addition thereto, the turning of the right handlebar 214 may cause the motorcycle 234 to perform certain tricks such as, wheelies and jumps, described in greater detail below.

Referring to FIGS. 9a–9e, the motorcycle 234 (not shown) is attached to the attachment post 238. The attachment post 238 is further secured to a lower attachment post 270 by a pivot pin 272 that permits the motorcycle 234 to pivot backwards such that the front wheels of the motorcycle 234 may lift off the front rollers imitating a wheelie, discussed in greater detail below. The lower attachment post 270 includes a first pivot gear segment 274 that meshes with a second pivot gear segment 276, both of which are pivotally attached to the housing. Extending downwardly from the second pivot gear segment 276 is a paddle 280 that is positioned to interrupt one or more sensors, in a plurality of sensors, which are fixed relative to the housing. Preferably the game apparatus 200 includes three sensors, a left sensor 282, a center sensor 284 and a right sensor 286. A counter weight 278 is further attached to the second pivot gear segment 276 such that the second pivot gear segment 276 maintains a substantially stable and vertical position when the housing 202 is moved or tilted. As shown in FIGS. 9b and 9e, the game apparatus 200 is being titled or moved to the left and right.

When the game apparatus 200 is held in a substantially horizontal position, the paddle 280 only interrupts the center sensor, indicating to the circuit board that the motorcycle is being maintained in a center position. When the game apparatus is tilted to the left (FIGS. 9b–9c) or; right (FIGS. 9d–9e), the counter weight, maintaining the second pivot gear segment 276 in a substantially vertical position causes the first pivot gear segment 274 to pivot to the left or right, respectively. This action causes the motorcycle 234 to lean into the tilt, appearing to lean into a turn.

As the game apparatus 200 is being tilted, the sensors 282 fixed to the housing move, causing the paddle 280 to interrupt the sensors accordingly. While being maintained in a substantially horizontal position, the paddle 280 covers the center sensor 284 (FIG. 9a). The circuit board 220 receiving such indication will determine that the motorcycle 234 is traveling straight ahead. When the game apparatus is tilted slightly to the left (FIG. 9b) indicated by arrow 290, the sensors move such that the paddle 280 is interrupting the left and center sensor 282 and 284. The circuit board 220 receiving this information from the sensors will determine that the motorcycle 234 is slightly turning and can determine the position of the motorcycle 234 in relation to the images being display on the displaying means 208. As such the circuit board 220 may change or alter the images or display to accommodate for the position change, such as if the motorcycle successfully passes another motorcycle being displayed or if the motorcycle by moving crashes into a wall. Referring now to FIG. 9c, the game apparatus 200 is titled strongly to the left indicated by arrow 292, causing the paddle 280 to only cover the left sensor 282 and causing the motorcycle 234 to lean strongly to the left. The circuit board 220 receiving the indication from the sensors can determine the position of the motorcycle 234 in relation to the images and may change the images, such if the motorcycle is making a sharp turn. Similarly, FIGS. 9d and 9e show the position of the aforementioned components when the game apparatus is turned slightly to the right (shown by arrow 294) and strongly to the right (shown by arrow 296).

Continuing to refer to FIG. 8, the attachment means and sensors may be are housed within a subassembly 300 that is movably secured in the housing 202. The subassembly is defined by a left and right assembly 302, 304 and a front and rear assembly 306, 308, respectively. As mentioned above, the user, when operating the game apparatus 200, may make the motorcycle 234 do a wheelie and a jump. When the right handlebar 254 is turned initially the speed of the rollers increase, however, if the right handlebar 254 is turned "all the way" the gear 260 will engage a second gear 268 that is meshed with a gear rack 269 located on the front assembly 306. When the second gear 268 begins to rotate, the subassembly 300 will rise, raising the motorcycle 234 off the rollers 230. However, the attachment post 238 is attached to the motorcycle 234 such that the motorcycle 234 pivots backwards and the rear wheel 232 on the motorcycle 234 maintains contact with the rollers 230, whereby the motorcycle appears to be performing a wheelie. If at the same time the motorcycle 234 is in this position, the user tilts the game apparatus 200 forwards, the motorcycle 234 will pivot forward such that all of its wheels 232 are off the rollers 230 such that it appears that the motorcycle 234 is off of the ground or jumping. While the circuit board 220 does not register either the wheelie or jumping action, additional sensors may be placed such that these actions may be received by the circuit board 220.

In addition, the housing 202 includes a front section 310 that includes a plurality of buttons 312 that are in communication with the circuit board 220, permitting the user to select various gaming options.

Figure 10:
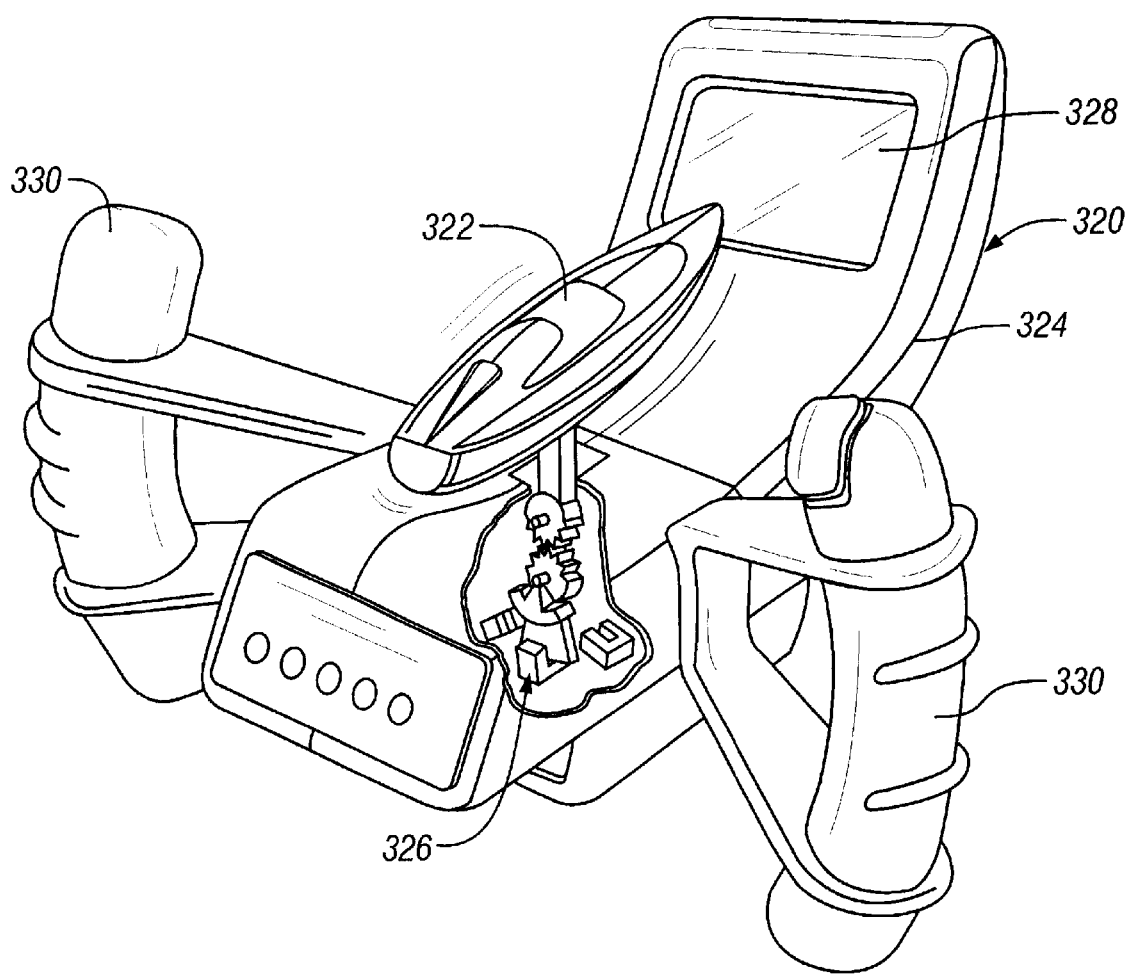
FIG. 10 is a perspective view of a game apparatus incorporating a three-dimensional boat and illustrating the attachment means and sensor arrangement used therein.

Referring now to FIG. 10 another game apparatus 320 is illustrated, similarly configured to the game apparatus 200 with a motorcycle 234. The game apparatus 320 shown in FIG. 10 includes a boat 322 rather than a motorcycle. The boat 322 is similarly attached through the housing 324. The sensors 326 would also read the position or the change in position of the boat and transmit the same to a circuit board (not shown) that would determine the position of the boat in relation to the images being displayed on the displaying means 328. The housing 324 also supports a pair of handles 330 that the user may grip onto and use to steer or tilt the unit to one side.

It is further contemplated by this invention that the user may move the three-dimensional vehicles by other means. Rather then tilting or moving the game apparatus, the game apparatus may incorporate other means, such as but not limited to joysticks, triggers, steering wheels, etc.

Figure 11A:
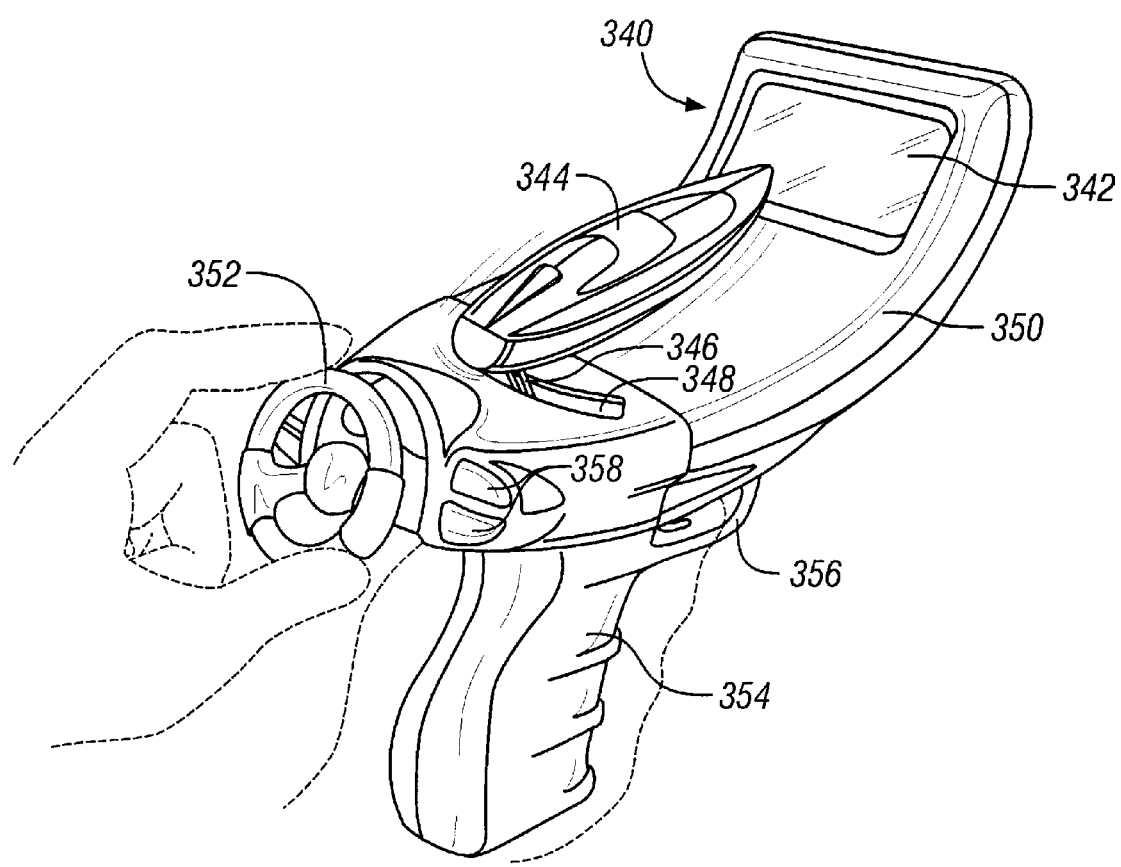
FIG. 11a is a perspective view of another game apparatus illustrating a different means for controlling the three dimensional vehicle.

Referring now to FIG. 11a, a game apparatus 340 is illustrated as having a display means 342 and a three-dimensional boat 344. The boat 344 is similarly attached by an attachment means 346 through a slot 348 in the housing 350 to a subassembly (not shown) in which tilting of the game apparatus 340 will similarly tilt the boat, shown in FIG. 12. In addition, the boat 344 may swing either to the left or right, FIG. 11b. A miniature steering wheel 352 is attached through the housing 350 to the subassembly such that by turning the steering wheel 352 to the left, the boat 344 will swing towards the left and similarly, when the steering wheel 352 is turned to the right, the boat 344 will swing to the right. The user may hold the game apparatus 340 upright by gripping a handle 354 extending downwardly from the bottom of the housing 350. A trigger mechanism 356 located on the handle 354 permits the user to control the speed or throttle. In addition, the housing 350 supports a plurality of buttons 358 that control the various gaming options available to the user. The display means 342 preferably shows images of water and other boats during a race. The circuit board (not shown) can read various sensors or inputs regarding the position of the boat 344 such that the circuit board can determine the position and speed of the boat 344 in relation to the images and adjust or change the images accordingly.

Figure 13:
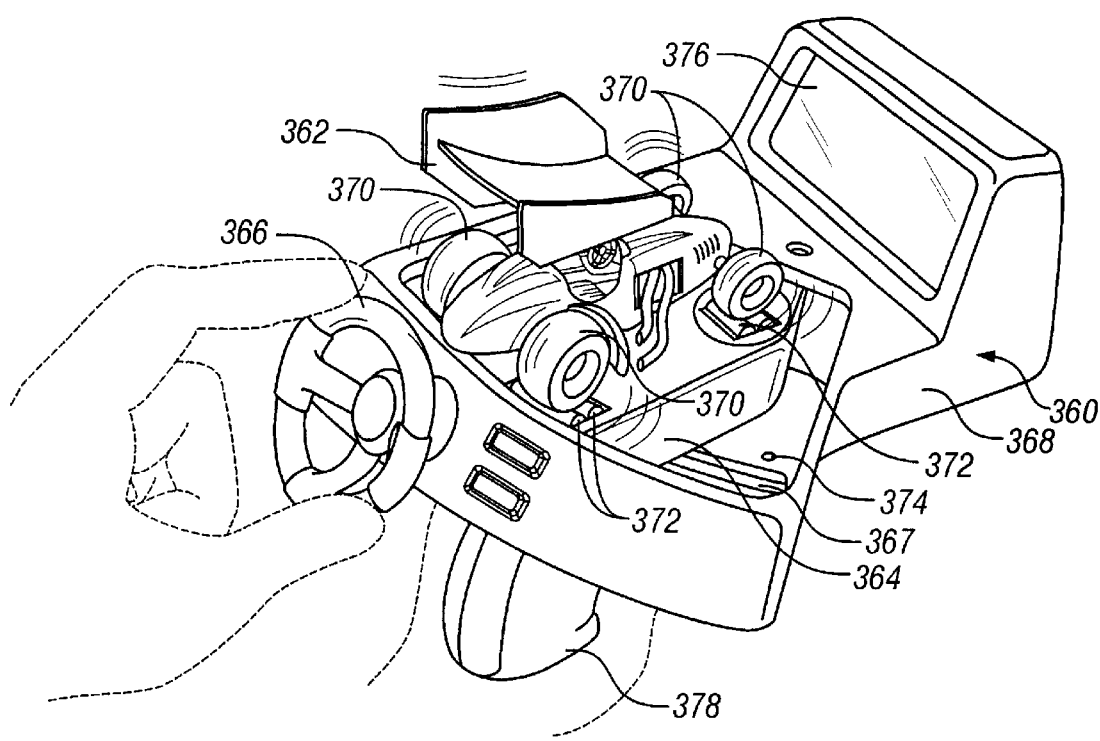
FIG. 13 is a perspective view of another game apparatus having a slidable vehicle bed.
Figure 14:
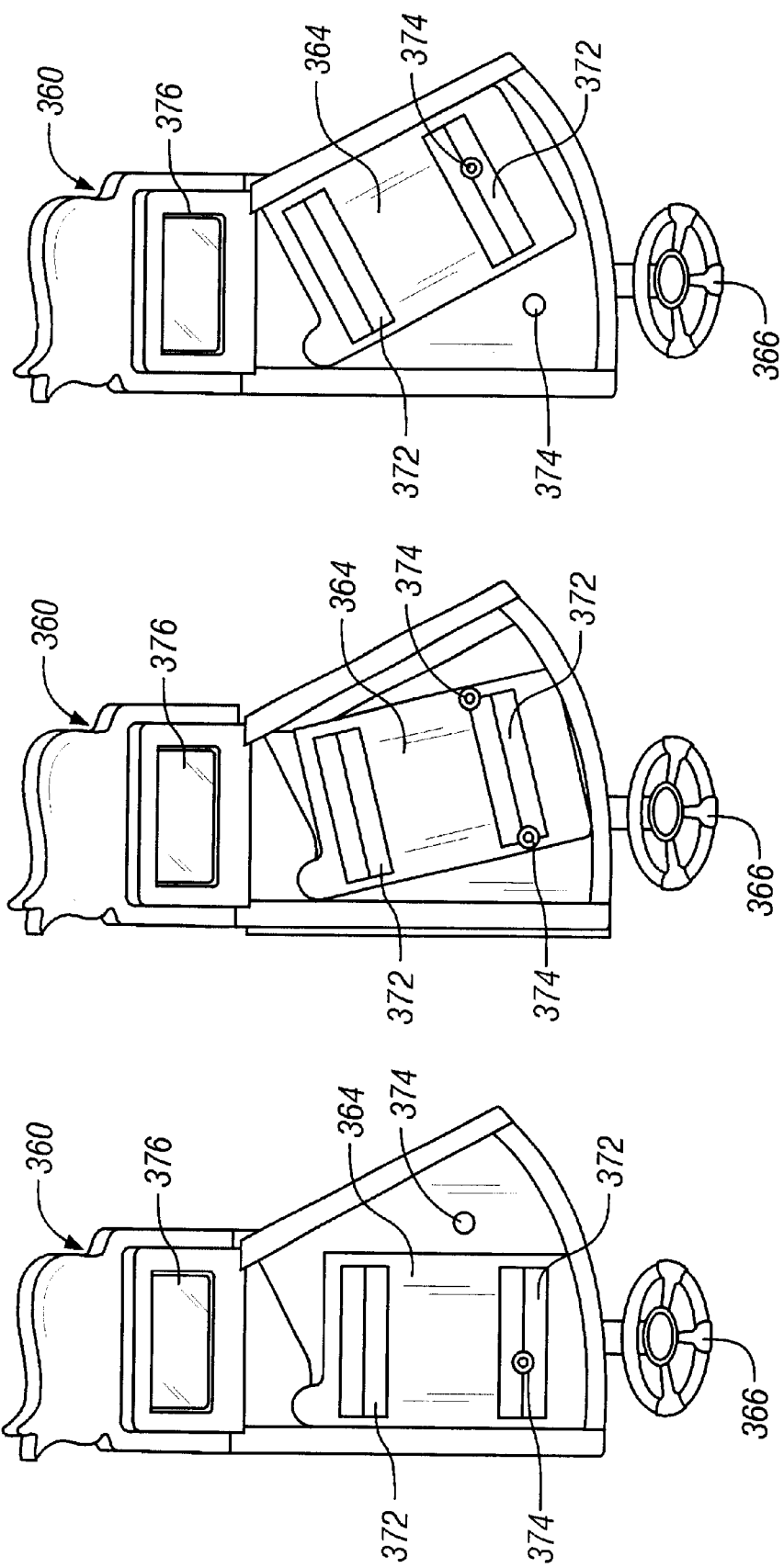
FIGS. 14a–14c are various top views illustrating the placement of sensors and the movement of the vehicle bed for the game apparatus illustrated from FIG. 13.

Referring now to FIGS. 13 and 14, a three-dimensional vehicle, representing a sprint car 362, is shown in connection with another portable game apparatus 360. The sprint car 362 is placed on a vehicle bed 364 that swings to the left or right in response to the turning of a steering wheel 366, which is supported by the housing 368. While not shown, the vehicle bed is attached to a post that laterally moves in a slot 367, defined in the vehicle bed 364. The post is further attached to the steering wheel 366 such that when the steering wheel is rotated to the right, the vehicle bed 364 swings to the right side of the housing 368 and such that when the steering wheel 366 is rotated to the left, the vehicle bed 364 swings to the left side of the housing 368.

The sprint car 362 has wheels 370 that rotate and rest upon rollers 372 that operate similarly as described above. The rollers 372 may be small rollers as shown in FIG. 13 that only occupy the space under the wheel or may extend along the length of the bed, as shown in FIGS. 14a–14c. Sensors 374 are supported by the housing 368 and read the position of the vehicle bed 364. As shown in FIGS. 14a through 14c the vehicle bed 364 may occupy three positions. FIGS. 1a and 14c show the vehicle bed 364 covering only one sensor 374 (illustrated by having one darkened in circle and one undarkened circle), while FIG. 14b shows the vehicle bed 364 covering both sensors 374. The circuit board receiving the indications from the sensors will determine the position of the car 362 in relation to the images on the display means 376. In addition the acceleration and deceleration is controlled by a trigger (not shown) on the handle 378, such that the harder the trigger is squeezed the greater amount of acceleration will be applied and likewise when the trigger is released the sprint car 362 decelerates.

Figure 15:
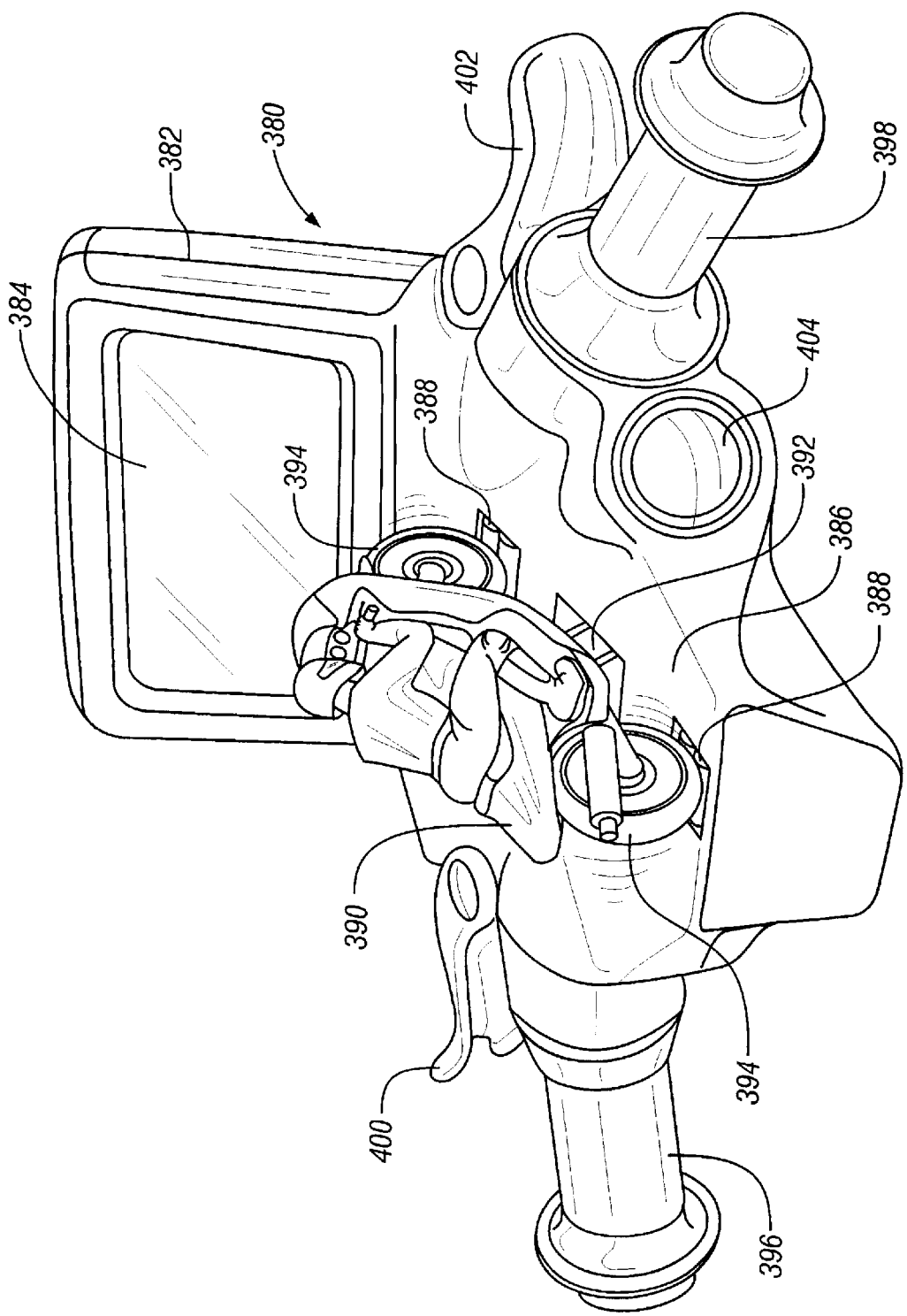
FIG. 15 is another game apparatus illustrating a motorcycle that incorporates levers next to the handles that when squeezed tilts the motorcycle to the left or right.

Referring to FIG. 15, another portable game apparatus is constructed in accordance with yet another embodiment of the present invention and is generally referenced by numeral 380. The game apparatus 380 includes a housing 382 that supports a display means 384 and a vehicle bed 386. The vehicle bed 386 supports front and rear rollers, generally 388, and supports a three-dimensional vehicle. As illustrated, the three dimensional vehicle is representative of a motorcycle 390. The motorcycle 390 is supported by an attachment means 392. The motorcycle 390 also has front and rear rotatably wheels 394 that rest on the front and rear rollers 388 such that when the front and rear rollers 388 rotate the front and rear wheels 394 rotate therewith.

The housing 380 further supports a pair of handlebars, a left handlebar 396 and a night handlebar 398, and supports a left lever 400 adjacent to the left handlebar 396 and a right lever 402 adjacent to the right handlebar 398. The housing 380 also includes a throttle button 404. The steering of the motorcycle 390 is accomplished by squeezing either the left or right handlebar 396 or 398, respectively. If the user wants the motorcycle 390 to lean or turn left, the user must squeeze the left lever 400, and if the user wants the motorcycle 390 to lean or turn right, the user must squeeze the right lever 402. The throttle button 404 controls the speed of the motorcycle 390 in relation to the images being displayed on the display means 384. These controls may either send signals to the circuit board (not shown) or sensors may be employed to indicate position changes. The circuit board receiving such signals can determine the position of the motorcycle 390 relative to the displayed images and may change or alter the images to accommodate for the relative position of the motorcycle 390.

Figure 16:
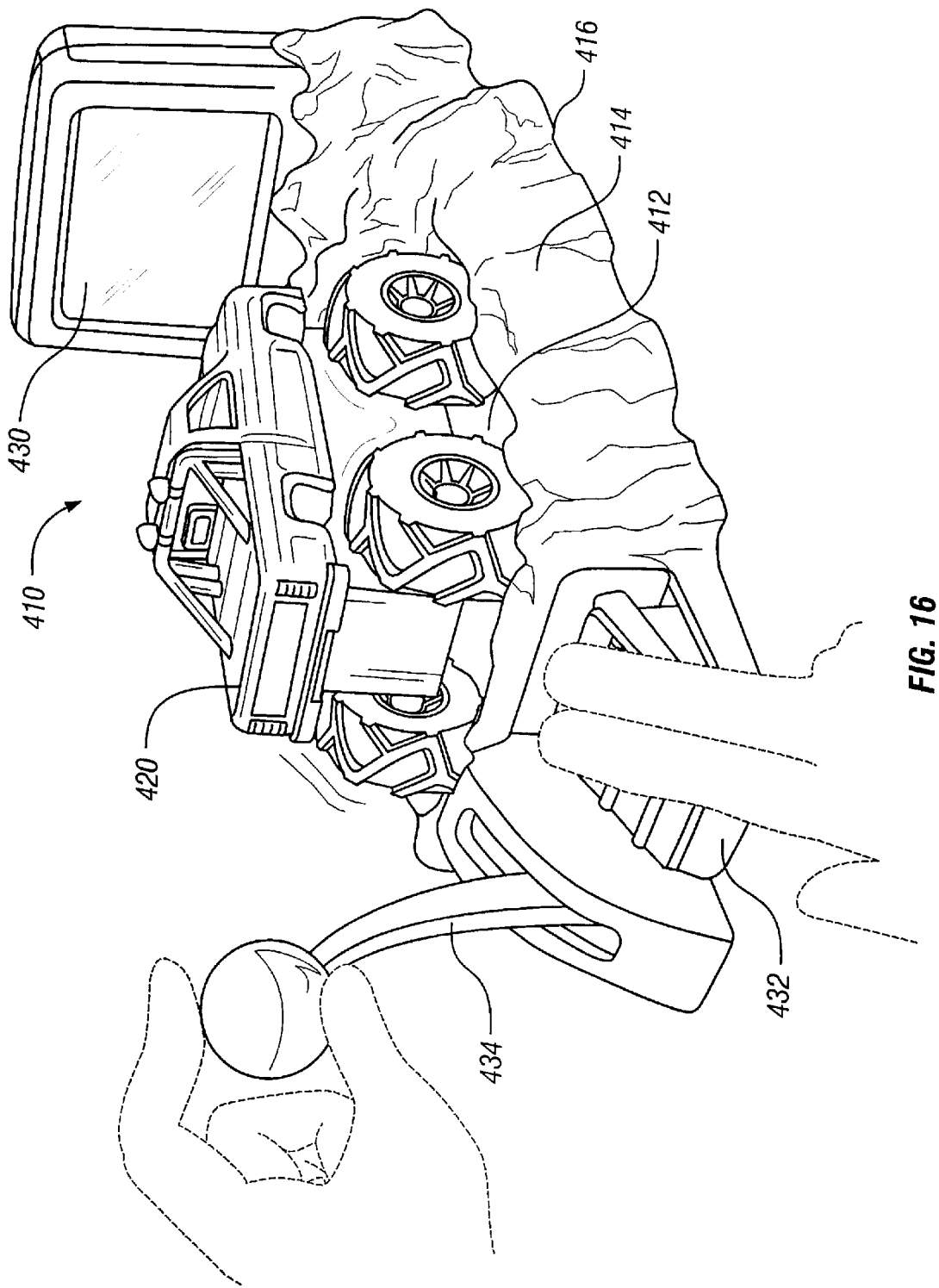
FIG. 16 is a desktop game apparatus illustrating a truck that incorporates a speed pedal and shifter to simulate gear shifting.
Figure 17A:
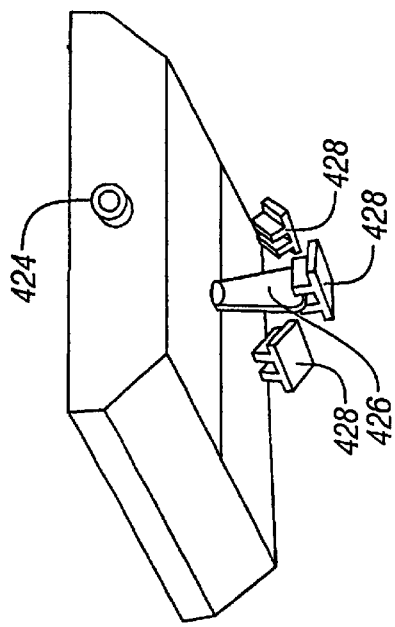
FIGS. 17a–17d illustrate the attachment means and sensor placement utilized to move the vehicle bed and to register such movement.
Figure 17B:
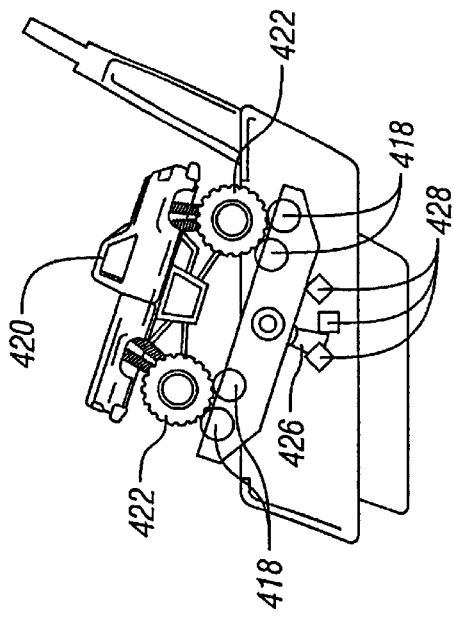
Figure 17C:
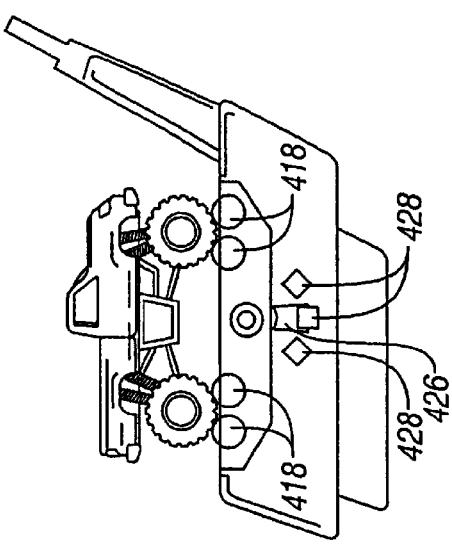
Figure 17D:
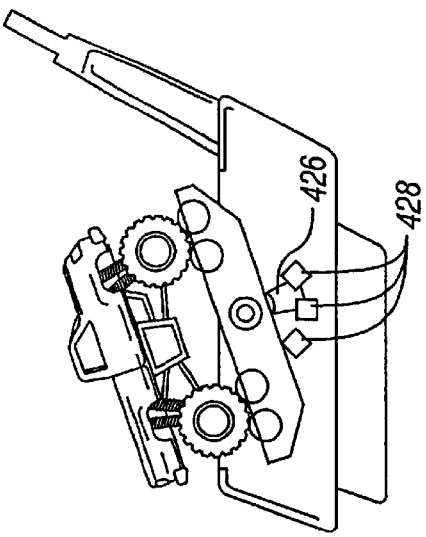

Referring now to FIG. 16, in addition to portable hand-held gaming apparatus the game apparatus may be designed to lie flat on a table (hereinafter "tabletop"). Tabletop game apparatus 410, illustrated in FIGS. 16 through 17 depict a monster truck 420 supported on a movable vehicle bed 412. The housing 414 has a substantially flat bottom portion 416 such that the user may rest the game apparatus 410 on a desk or other flat surface. The wheels 422 on the truck are rotatable and rest upon rollers 418 (shown in FIGS. 17a–d) that are supported by the vehicle bed 412. The vehicle bed 412 is movably attached to the housing 414 at a pivoting means 424 such that the ends of the vehicle bed 412 may swing up and down causing the front and rear end of the vehicle bed 412 to raise and lower, as shown in FIGS. 17b–17d. Attached to the underside of the vehicle bed 412 is a paddle 426 that is positioned to interrupt a plurality of sensors 428 that are fixed relative to the housing. As the vehicle bed 412 moves, the paddle 426 interrupts various combinations of the sensors 428. Signals are communicated to a circuit board (not shown), which controls the images on the display means 430 as well as controls the movement of the vehicle bed 412, and the rotational speed of the rollers 418. The signals indicate to the circuit board the position, direction or movement of the truck 420, or vehicle bed 412, in relation to the images being displayed on the display means 430. Moreover, the circuit board may alter or change the images in response to the position, direction or movement and also control the truck 420 such that failure to steer or control the truck 420 properly may result in the circuit board stopping the rotation of the rollers 418 and thus stopping the truck 420.

The speed of the rollers 418 is controlled through a pedal control mechanism 432 that the user may press down with their fingers. The user may also shift the truck 420 through different high and low gears through a shifter mechanism 434. When in use, the images being displayed show various terrains that would require the use to drive over obstacles, climb up and down hills, etc. Through the use of the pedal 432 and the shifter 434 the user can steer and throttle the truck 420 over and down the obstacles. The ends of the vehicle bed 412 pivot up and down depending upon the amount of throttle, shifting, and depending upon the terrain.

Figure 18:
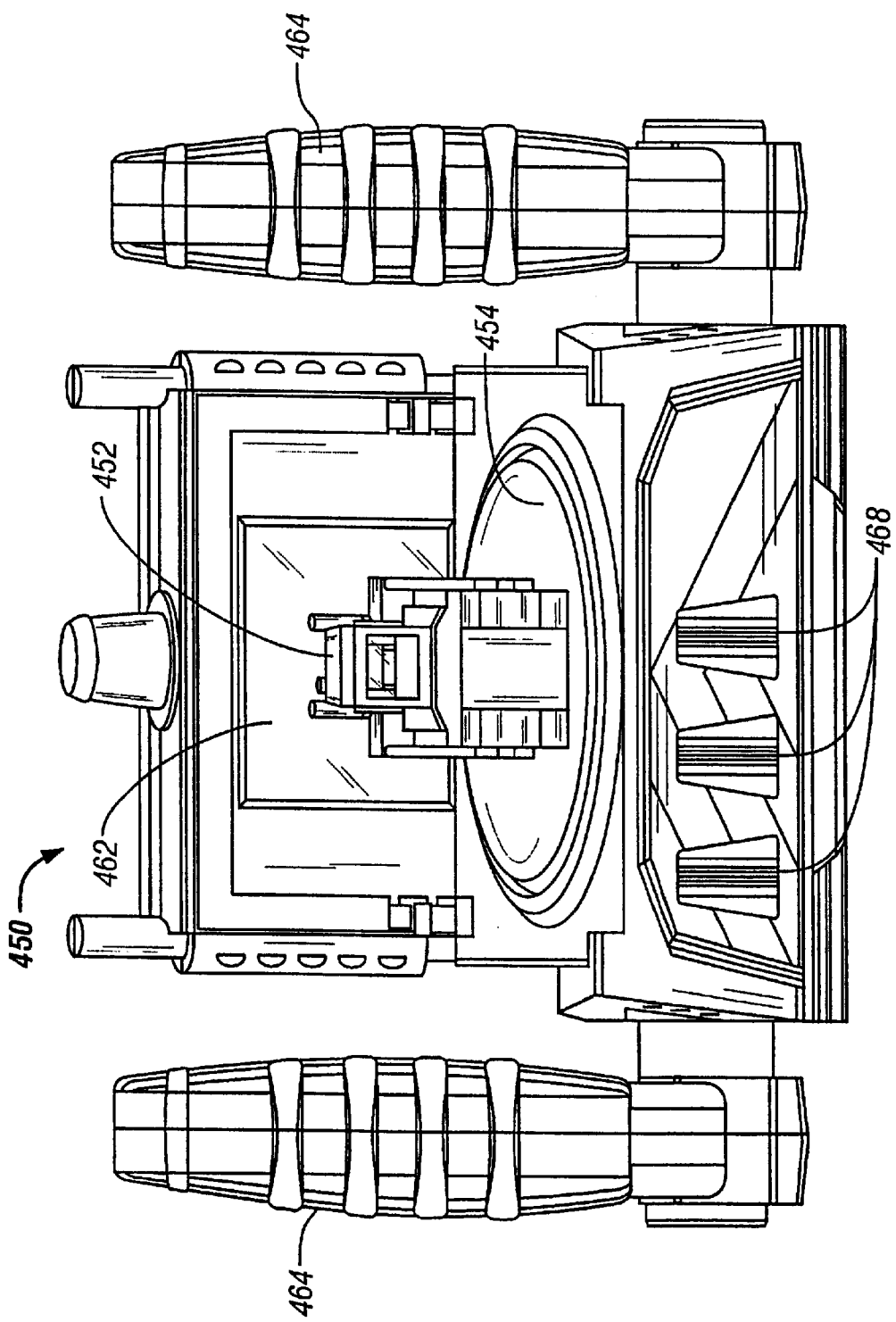
FIG. 18 is a front view of a game apparatus with a bulldozer three dimensional vehicle.
Figure 19A:
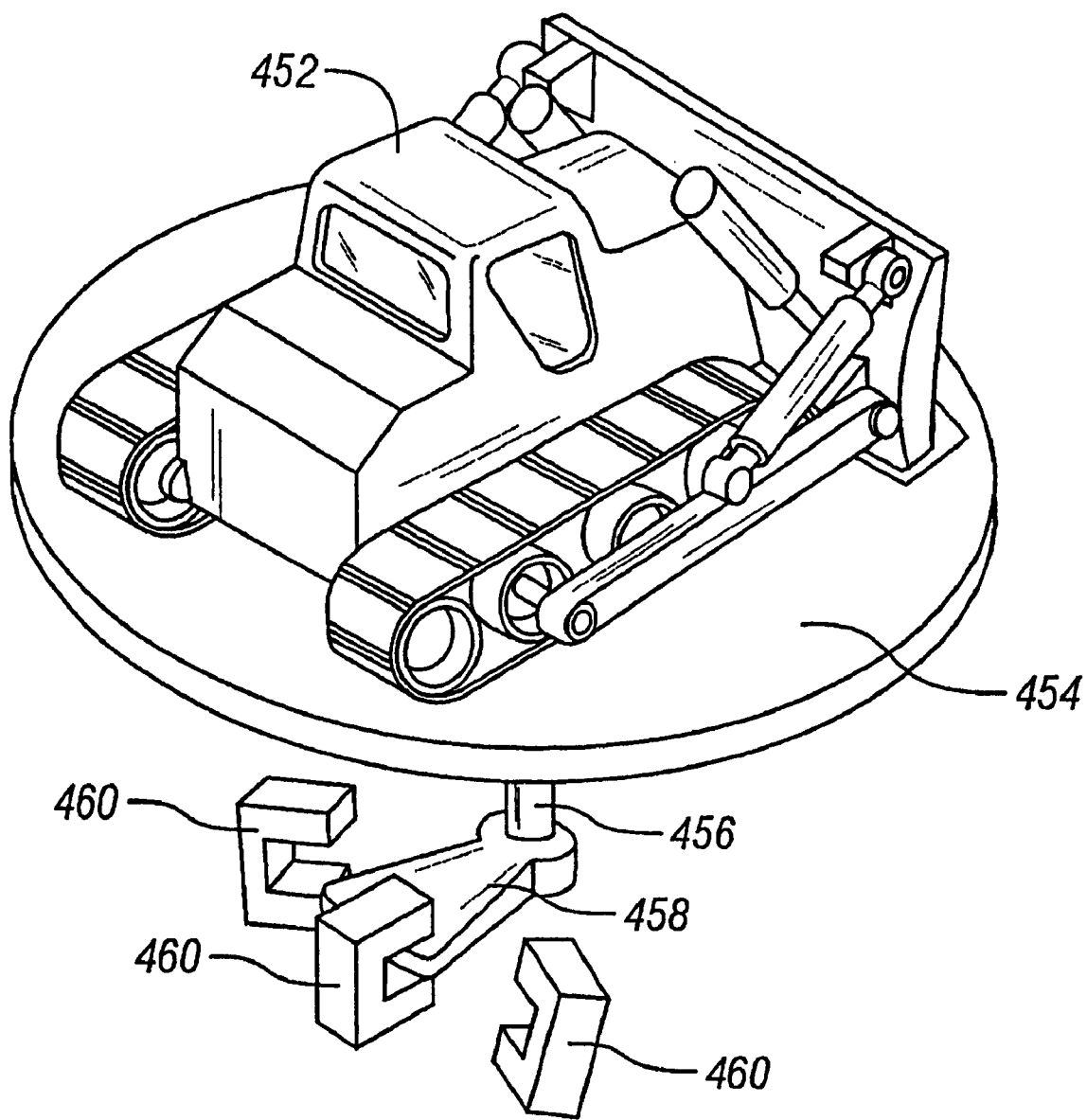
FIG. 19a is a partial view of the bulldozer on a movable vehicle bed and the arrangement of the sensor to track the movement of the vehicle bed.
Figure 19B:
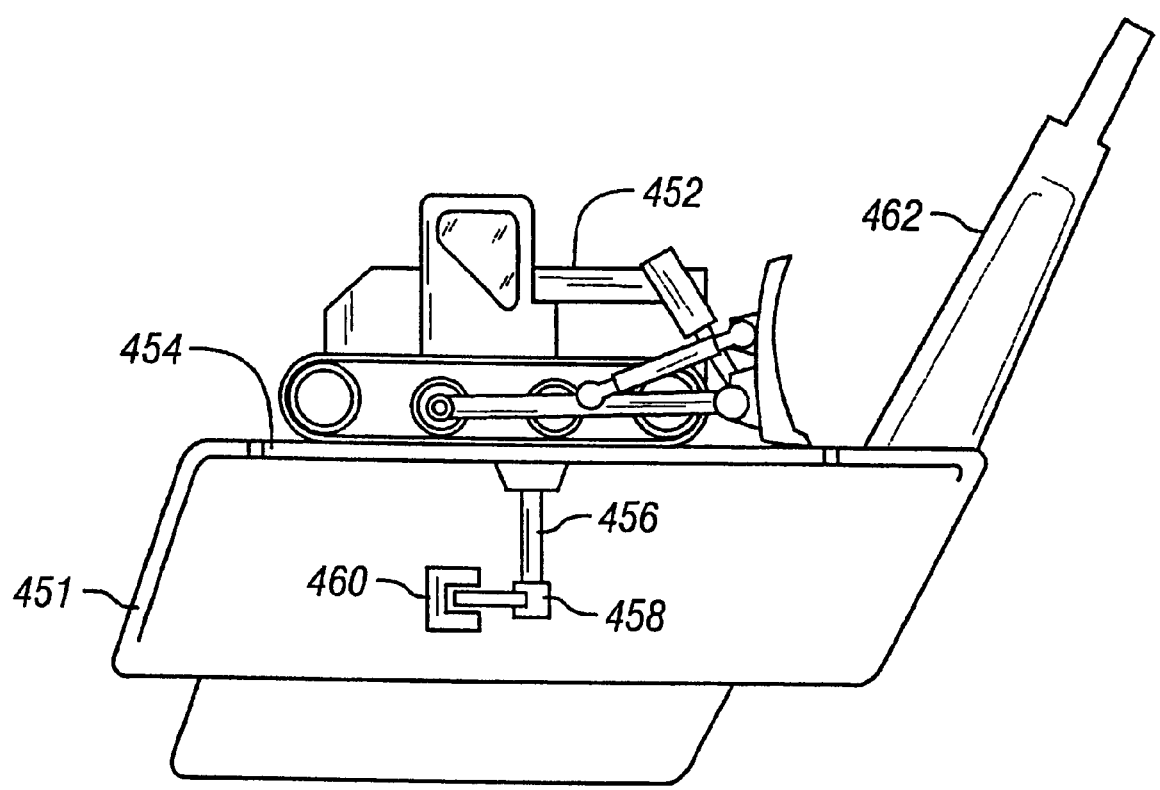
FIG. 19b is a side view of the game apparatus from FIG. 18 illustrating the bulldozer and the attachment means.
Figure 20:
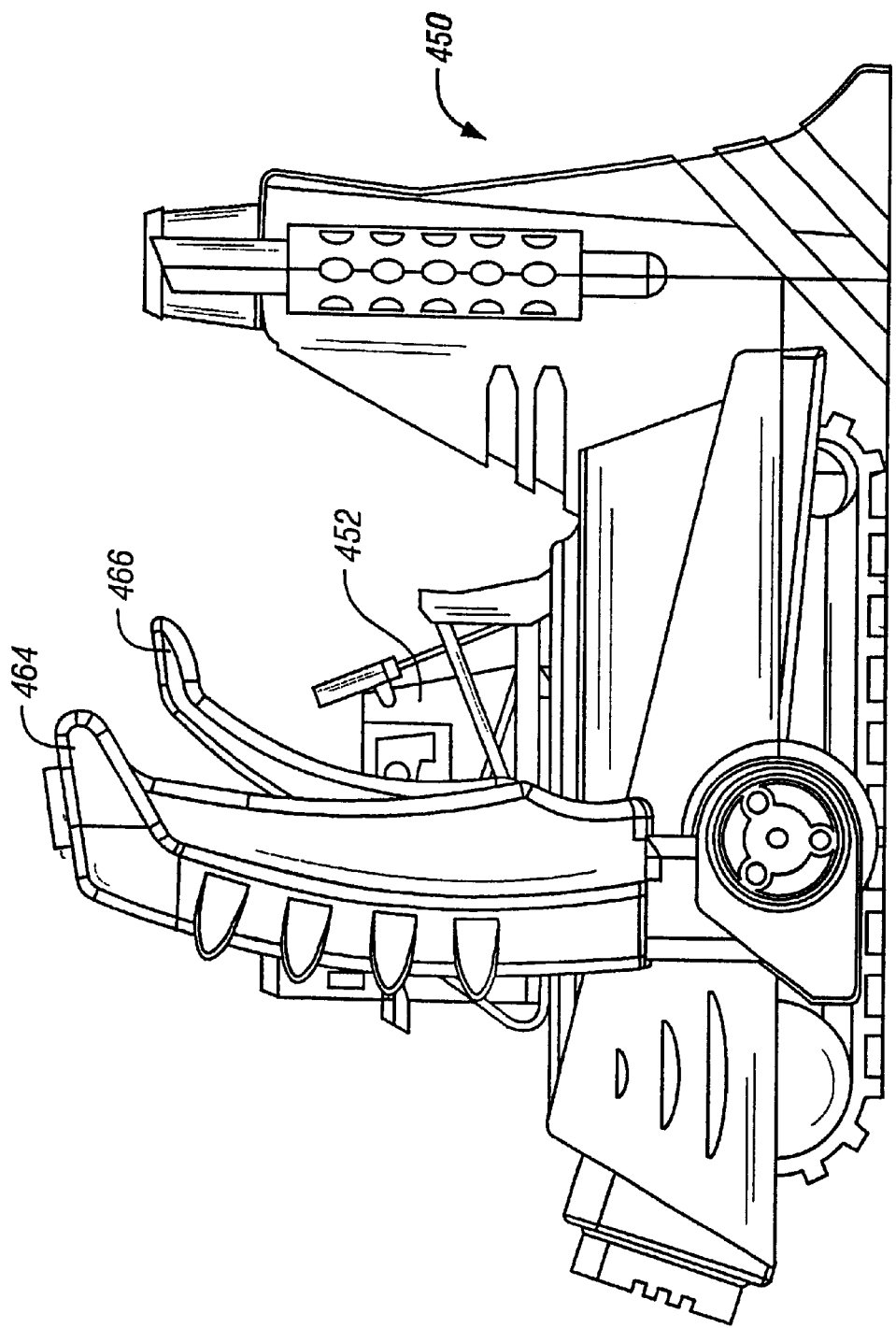
FIG. 20 is a side view of the game apparatus from FIG. 18 illustrating the levers and handles used to operate the apparatus.

Referring now to FIGS. 18–20, another embodiment of the present invention is illustrated, showing a tabletop game apparatus 450 incorporating a three-dimensional vehicle that represents a bulldozer 452. The bulldozer 452 is supported on a vehicle bed 454 that may rotate either to the left or right in a manner described below. The vehicle bed 454 is attached to an attachment post 456 that leads to a paddle 458, which is positioned to interrupt various sensors 460. The sensors 460 are fixed relative to the housing 451 of the game apparatus 450 such that when the platform 454 rotates the sensors 460 remain fixed and the paddle 458 may move and interrupt the sensors 460 in various combinations. The sensors 460 sends signals to a circuit board (not shown) which can determine the position or direction of the bulldozer 452 in relation to various images being displayed on a display means 462, the images of which are controlled or displayed on command by the circuit board. The game apparatus 450 further includes various knobs or buttons 468 on the front portion thereof, which permit the user to select various gaming options, prior to or during play.

Two levers 464, located on either side of the game apparatus 450 are utilized to rotate the platform 454 to the left and the right. A throttle control mechanism 466 is preferably placed behind one of the levers 464, and when squeezed the circuit board can increase the rate of scrolling of the images on the display means 462, such that it appears that the bulldozer 452 is moving or traveling faster.

Figure 21A:
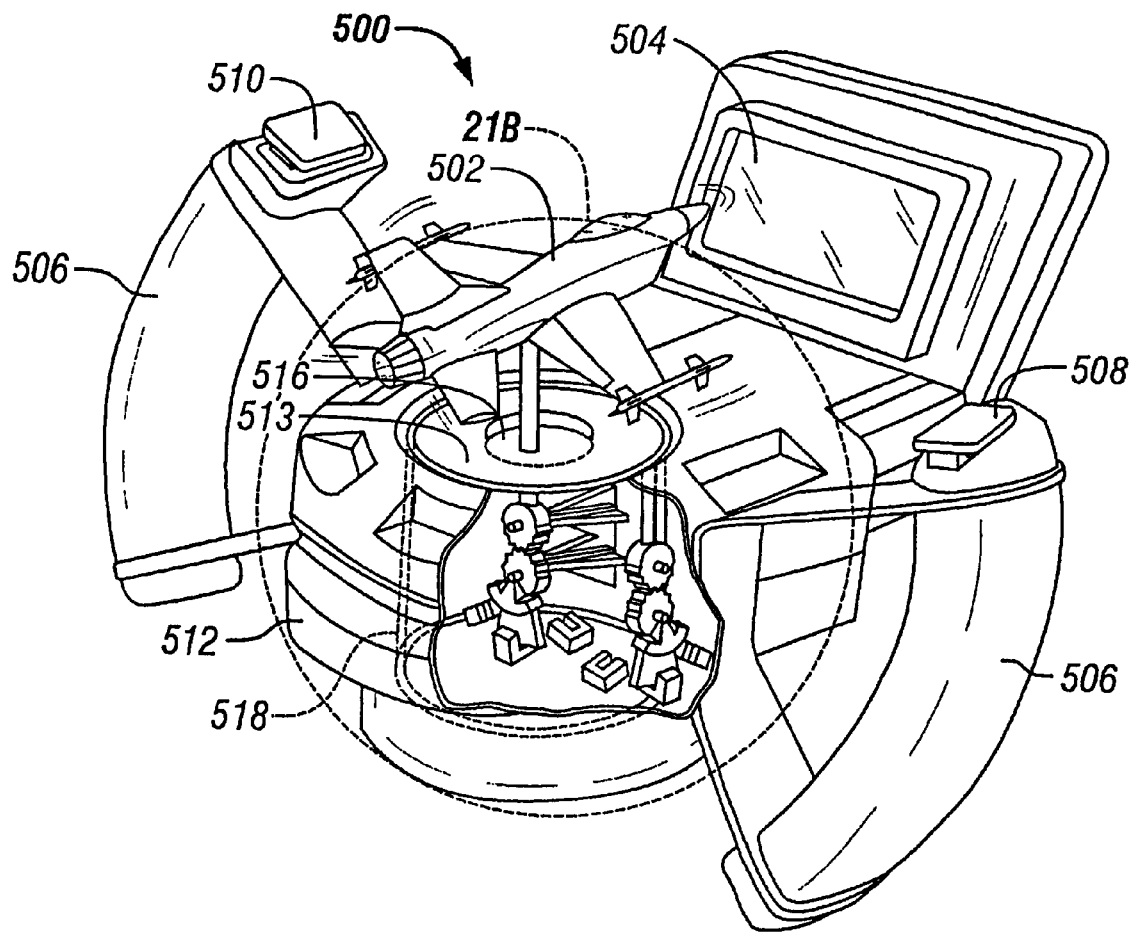
FIG. 21a is a perspective cross view of a game apparatus incorporating an air vehicle that has two perpendicular sets of sensors to monitor the pitch and roll of the vehicle.
Figure 21B:
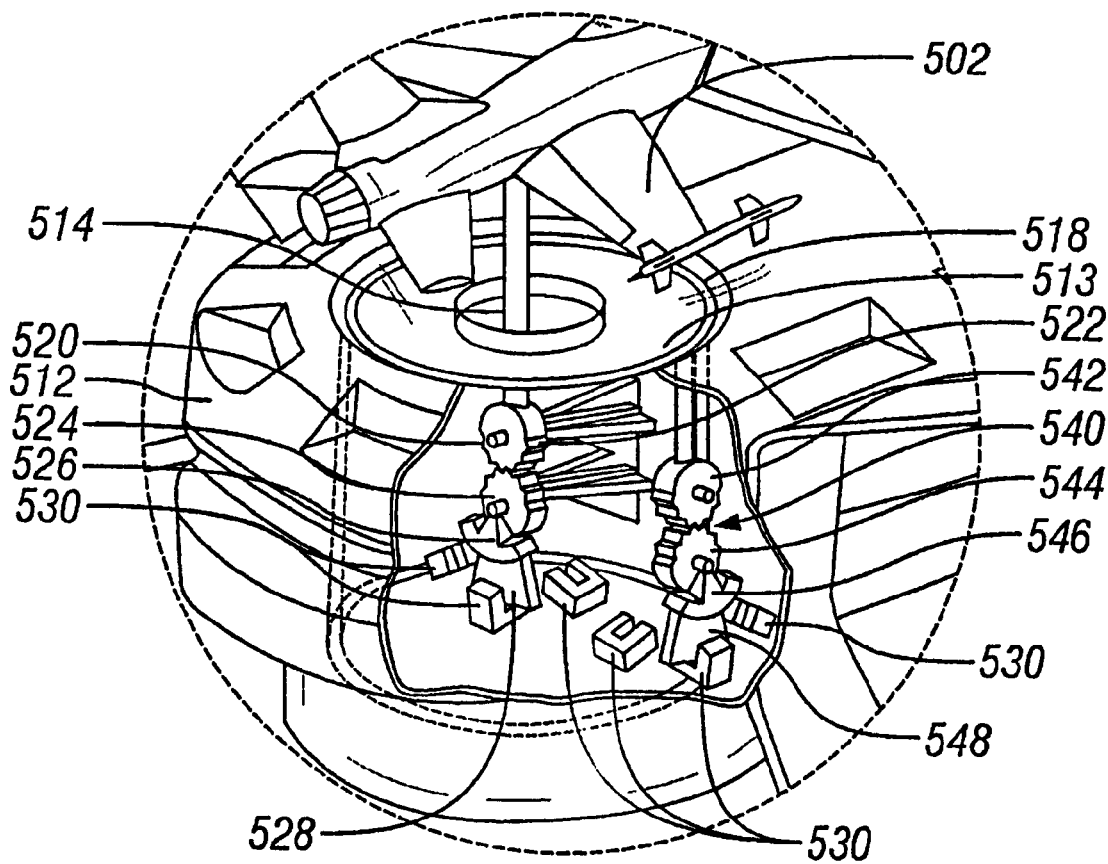
Figure 22:
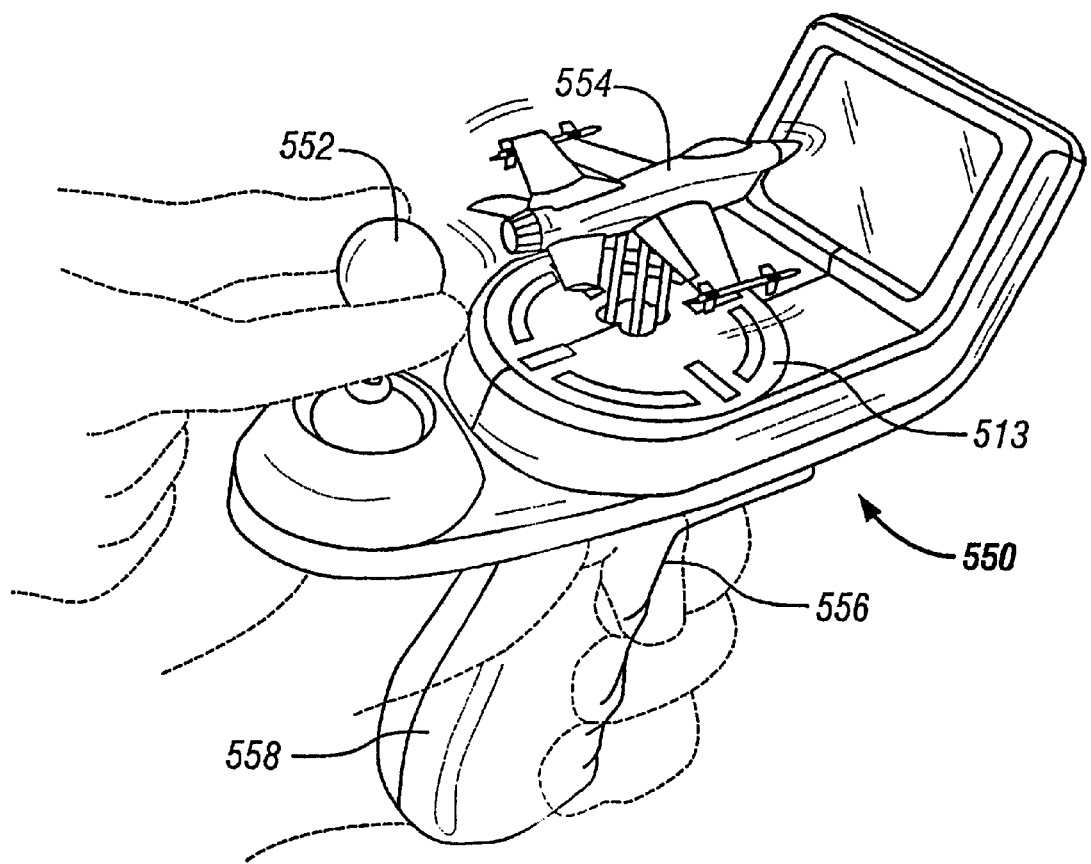
FIG. 22 is another game apparatus using a joystick to operate or move the air vehicle.

It yet another embodiment of the present invention, a portable or tabletop game apparatus showing an air vehicle is illustrated in FIGS. 21 through 22 and generally referenced as 500. Referring first to FIGS. 21a and 21b, the game apparatus 500 includes a three-dimensional fighter plane 502, however, other flying vehicles may be employed. The game apparatus 500 supports a display means 504 and a left and right handle 506, which separately support a throttle button 508 and a brake button 510. The fighter 502 may pitch up or down, by tilting the game apparatus 500 forwards or backwards, or may roll to the left or right by tilting the game apparatus 500 to the left or right. A circuit board (not shown) can determine the fighter's 502 pitch and roll by receiving signals from two sets of sensors set on perpendicular axis's, discussed in greater detail below.

The game apparatus 500 includes an outer housing 512 that supports the display means 504 and the handles 506. The fighter 502 is supported by on the end of an attachment means 514 that passes through an opening 516 in the vehicle bed 513, also supported by the housing 512. The other end of the attachment means 514 is supported within an inner housing 518. The attachment means 514 is similarly designed as described above in reference to FIGS. 9a through 9e.

As mentioned above, the fighter 502 may be moved to the left or right relative to the housing by tilting the game apparatus 500 to the left or right, similar to a roll executed by a plane. In order for the circuit board or control means to sense a roll, the game apparatus includes a roll mechanism 520, which determines and transmits to the control means the amount or degree of roll. The roll mechanism 520 includes a first roll pivot gear 522 that is secured to the lower end of the attachment means 514. The first roll pivot gear 522 is meshed with a second roll pivot gear 524 that is rotatably mounted to the inner housing 518. The second roll pivot gear 524 includes a roll counter weight 526 and a paddle 528. The roll counter weight 526 maintains the second roll pivot gear 524 and the paddle 528 in a substantially vertical position, such that when the outer housing 512 is tilted, the roll counter weight 526 causes the second roll pivot gear 524 to pivot the first roll pivot gear 522 in the same direction as the tilt. The paddle will then move through roll sensors 530, which are mounted within and to the inner housing 518, thus indicating to the circuit board the degree of roll.

In order to determine or read the degree of pitch (or the amount of tilt forward and backwards), a pitch mechanism 540 is mounted perpendicular to the roll mechanism between the inner housing 518 and the outer housing 512.

The pitching mechanism 540 includes a first pitch pivot gear 542 mounted to the outside of the inner housing 518. The first pitch pivot gear 542 is meshed with a second pitch pivot gear 544 that is pivotally mounted to the inside of the outer housing 512. A counter weight 546 mounted to the second pitch pivot gear 544 maintains the second pitch pivot gear 544 in a substantially vertical position, such that when the outer housing 512 is tilted (forwards or backwards), the counter weight 546 causes the second pitch pivot gear 544 to pivot the first pitch pivot gear 542 in the same direction as the tilt. As such the inner housing 512 will tilt or pitch relative to the movement of the outer housing 512. The second pitch pivot gear 544 further includes a paddle 548 that stays substantially vertical when the outer housing 512 is tilted. The paddle 548 passes through a plurality of pitching sensors 530 secured to the outer housing 512 that indicate to the circuit board (not shown) the degree of pitch.

In yet another embodiment of the present invention, FIG. 22 a game apparatus 550 may include a joystick 552 that controls the roll and pitch of the three-dimensional aircraft 554. An acceleration trigger 556 may further be provided on a handle 558 that is supported by the apparatus 550. The apparatus 550 further includes a display means 560 that is controlled in a similar fashion as stated above with the other embodiments.

It is further contemplated by this invention that additional sensors and pivoting mechanisms may be added or combined to increase the range and direction of movements and positions permitted by any of the above-mentioned game apparatuses.

The three-dimensional object does not, however, have to be a vehicle, for instance, it may be conceived by the present invention, that the three-dimensional object may be a toy animal, to be used in a game apparatus that includes a maze in which the user must race the animal through a variety of mazes.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A portable simulation game apparatus comprising:
a housing having a means for displaying pre-programmed images;
a pair of handles supported by said housing and constructed to be gripped by a user;
a control means coupled to the display means for controlling and scrolling said pre-programmed images;
a three dimensional vehicle movably supported by the housing, wherein the user gripping said handles may slide the three dimensional vehicle across said housing by tilting and moving said game apparatus;
a plurality of sensors coupled to the control means and supported by the housing, said plurality of sensors transmit to said control means a relative position of the three dimensional vehicle in relation to the housing and transmit any movement of the three dimensional vehicle in relation to the housing; and
the control means receiving said movement and position of the three dimensional vehicle determines the position of the three dimensional vehicle relative to the pre-programmed images on the display means, such that the control means may alter the images on the display means in response to the movement and position of the three dimensional vehicle.

2. The portable simulation game apparatus of claim 1 further comprising:
a front pair and rear pair of rollers supported by the housing, said rear pair of rollers being spaced from said front pair of rollers by a predetermined distance;
a motor means for rotating the front pair and rear pair of rollers; and
wherein the three dimensional vehicle is a ground vehicle having front and rear rotatable wheels, said front and rear rotatable wheels being spaced by said predetermined distance and being supported by said front pair and said rear pair of rollers, respectively.

3. The portable simulation game apparatus of claim 1, wherein the handles separately support an acceleration button and a brake button operatively connected to the control means for controlling a speed in which the pre-programmed images are being scrolled on the display means.

4. The portable simulation game apparatus of claim 2, wherein the handles separately support an acceleration button and a brake button operatively connected to the control means for controlling a speed in which the pre-programmed images are being scrolled on the display means and operatively connected to the motor means for controlling a speed in which the front and rear pair of rollers rotate.

5. The portable simulation game apparatus of claim 1 further comprising a sound circuit in communication with the control means for producing a plurality of audible sounds.

6. The portable simulation game apparatus of claim 1 further comprising:
a slidable vehicle bed supported by the housing;
a means for moving the slidable vehicle bed; and
a front pair of rollers supported by the housing and a rear pair of rollers supported by the slidable vehicle bed defining an adjustable distance between said front pair and said rear pair of rollers, and
whereby when the three dimensional vehicle has front rotatable wheels and rear rotatable wheels a predetermined distance from said front rotatable wheels, the slidable vehicle bed may be moved such that the adjustable distance between said front pair and said rear pair of rollers is approximately equal to said predetermined distance between the front and rear rotatable wheels of said three dimensional vehicle.

7. The portable simulation game apparatus of claim 6 further comprising a piston supported by the housing in proximity to the front pair of rollers and in contact with a front end defined by the three dimensional vehicle, said piston in communication with the control means such that said control means may raise and lower the piston and consequently raise and lower the front end of the three dimensional vehicle.

8. The portable simulation game apparatus of claim 1 further comprising a means for transmitting information in relation to at least the position and movement of the three dimensional vehicle to a second game apparatus similarly configured, and a means for receiving information in relation to at least the position and movement of a second three dimensional vehicle defined by said second game apparatus, wherein the control means for the game apparatus and a second control means defined by said second game apparatuses upon receiving said information may determine the position and movement of the three dimensional vehicle and the second three dimensional vehicle in relation to each other and the pre-programmed images on the display means, such that the control means and the second control means may alter the images on a corresponding display means in response to the position and movement of said three dimensional vehicle and said second three dimensional vehicle.

9. A portable simulation game apparatus comprising:
   a housing having a means for displaying pre-programmed images and a vehicle bed;
   a control means coupled to the display means for controlling and scrolling said pre-programmed images;
   a three dimensional vehicle movably attached to the housing by an upper post extending through the vehicle bed and attaching to the three dimensional vehicle such that said three dimensional vehicle is supported above said vehicle bed;
   a lower post, within said housing, meshed to the upper post;
   a counter weight attached to the lower post such that the lower post maintains a substantially vertical position when the housing is moved in a direction, causing the upper post to pivot in said direction; and
   a paddle extending downwardly from the lower post positioned to interrupt at least one sensor, of a plurality of sensors;
   the plurality of sensors in communication with the control means such that when the paddle interrupts said sensors, the plurality of sensors transmit to said control means a relative position of the three dimensional vehicle in relation to the housing and transmit any movement of the three dimensional vehicle in relation to the housing; and
   the control means receiving said position and movement of the three dimensional vehicle determines the position of the three dimensional vehicle relative to the pre-programmed images on the display means, such that the control means may alter the images on the display means in response to the position and movement of the three dimensional vehicle.

10. The portable simulation game apparatus of claim 9 further comprising user inputs to increase and decrease a rate in which the pre-programmed images are being scrolled on the display means.

11. The portable simulation game apparatus of claim 10 further comprising a pair of handles supported by said housing and constructed to be gripped by a user, wherein the user gripping said handles may tilt the three dimensional vehicle by tilting and moving said game apparatus.

12. The portable simulation game apparatus of claim 11 further comprising:
   a pair of levers connected to the housing separately in proximity of each handle and at least one of said pair of levers being in communication with the control means, wherein said lever when pressed, decreases the rate in which the pre-programmed images are being scrolled on the display means, and
   wherein one of the pair of handles is rotatably attached to said housing and is in communication with the control means, such that the rotation of said handle controls a rate in which the pre-programmed images are being scrolled on the display means.

13. The portable simulation game apparatus of claim 12, wherein the three dimensional vehicle has at least one front rotatable wheel and at least one rear rotatable wheel and a vehicle body, said vehicle body being attached to the upper post of the attachment means.

14. The portable simulation game apparatus of claim 13 further comprising:
   a pair of front rollers rotatably supported by the vehicle bed and in contact with the at least one front wheel of the three dimensional vehicle;
   a pair of rear rollers rotatably supported by the vehicle bed, the rear rollers being spaced from said front rollers such that the rear rollers are in contact with the at least one rear wheel of the three dimensional vehicle; and
   a motor means for rotating said pairs of front and rear rollers causing the front and rear wheels of the three dimensional vehicle to spin; and
   said motor means being operably connected to the control means such that the control means in response to the user inputs may increase and decrease a rate in which the motor means rotates the front and rear rollers.

15. The portable simulation game apparatus of claim 13, further comprising a means to raise the front rotatable wheel of the three dimensional vehicle.

16. The portable simulation game apparatus of claim 14 or 15 wherein the three dimensional vehicle is a motorcycle.

17. The portable simulation game apparatus of claim 10 further comprising:
   a handle extending downwardly from the housing and constructed to be gripped by a user, wherein the user gripping said handle may move the three dimensional vehicle by tilting and moving said game apparatus.

18. The portable simulation game apparatus of claim 10 further comprising:
   a left side and a right side defined by the vehicle bed; and
   a means for moving the three dimensional vehicle to the left side or the right side of the vehicle bed.

19. The portable simulation game apparatus of claim 18, wherein the means for moving the three dimensional vehicle to the left side or the right side of the vehicle bed includes a wheel constructed to be operated by a user and operatively attached to the attachment means such that when the wheel is rotated to the right, the three dimensional vehicle laterally swings to the right side of the vehicle bed and when the wheel is rotated to the left, the three dimensional vehicle laterally swings to the left side of the vehicle bed.

20. The portable simulation game apparatus of claim 19, wherein the three dimensional vehicle is a water vehicle.

21. A portable simulation game apparatus comprising:
   a housing having a means for displaying pre-programmed images and a vehicle bed;
   a control means coupled to the display means for controlling and scrolling said pre-programmed images;
   a three dimensional vehicle supported on the vehicle bed;
   an attachment means moveably attaching the vehicle bed to the housing such that a user during operation may move the vehicle bed relative to the housing, causing the three dimensional vehicle to move relative to the housing;
   a plurality of sensors in communication with the control means and the vehicle bed such that the plurality of sensors transmit to said control means a relative position of the vehicle bed in relation to the housing and transmit to said control means any movement of the vehicle bed in relation to the housing; and
   the control means receiving said position and movement of the vehicle bed determines the position of the vehicle bed relative to the pre-programmed images on the display means, such that the control means may alter the images on the display means in response to the position and movement of the vehicle bed.

22. The portable simulation game apparatus of claim 21 further comprising:
- a handle extending downwardly from the housing and constructed to be gripped by a user; and
- a trigger defined by the handle, said trigger in communication with the control means to increase and decrease a rate in which the pre-programmed images are being scrolled on the display means.

23. The portable simulation game apparatus of claim 22 further comprising:
- a left side and a right side defined by the housing; and
- a means for swinging the vehicle bed to the left side or the right side housing, said means includes a wheel, supported by the housing and constructed to be operated by a user and meshed with the attachment means such that when the wheel is rotated to the right, the vehicle bed laterally swings to the right side of the housing and when the wheel is rotated to the left, the vehicle bed laterally swings to the left side of the housing.

24. The portable simulation game apparatus of claim 23 further comprising:
- a pair of front rollers rotatably supported by the vehicle bed and in contact with front wheels defined by the three dimensional vehicle;
- a pair of rear rollers rotatably supported by the vehicle bed, the rear rollers being spaced from said front rollers such that the rear rollers are in contact with rear wheels defined by the three dimensional vehicle; and
- a motor means for rotating said pairs of front and rear rollers causing the front and rear wheels of the three dimensional vehicle to spin; and
- said motor means being operably connected to the control means such that the control means in response to the trigger defined by the handle may increase and decrease a rate in which the motor means rotates the front and rear rollers.

25. The portable simulation game apparatus of claim 21 further comprising:
- a pair of movable handles extending upwardly from the housing, the pair of handles are in communication with the attachment means such that the vehicle bed may be moved in accordance with moving the pair of handles; and
- a lever supported by one of the handles and in communication with the control means such that by pressing and releasing the lever the control means may increase and decrease a rate in which the pre-programmed images are being scrolled on the display means.

26. The portable simulation game apparatus of claim 25, wherein the three dimensional vehicle is a bulldozer.

27. A portable simulation game apparatus comprising:
- a housing having a means for displaying pre-programmed images and a vehicle bed;
- a control means coupled to the display means for controlling and scrolling said pre-programmed images;
- a three dimensional vehicle supported on the vehicle bed;
- a means for moving the three dimensional vehicle relative to the housing in response to the pre-programmed images displayed on said display means;
- a plurality of sensors in communication with the control means and positioned to sense and transmit to said control means a relative position of the three dimensional vehicle in relation to the housing and transmit any movement of the three dimensional vehicle in relation to the housing; and
- the control means receiving said position and movement of the three dimensional vehicle determines the position of the three dimensional vehicle relative to the pre-programmed images on the display means, such that the control means may alter the images on the display means in response to the position and movement of the three dimensional vehicle.

28. The portable simulation game apparatus of claim 27, wherein the means for moving the three dimensional vehicle relative to the housing includes:
- an attachment means moveably attaching the vehicle to the housing such that when the attachment means is moved the vehicle moves therewith;
- a pair of handles supported by the housing and constructed to be gripped by a user; and
- a pair of levers connected to the housing separately in proximity of each handle such that each lever may be gripped and pressed towards each handle, each lever further in communication with the attachment means such that the user may move the attachment means by pressing at least one of said levers.

29. The portable simulation game apparatus of claim 28 further comprising user inputs to increase and decrease a rate in which the pre-programmed images are being scrolled on the display means.

30. The portable simulation game apparatus of claim 29, wherein the three dimensional vehicle is a motorcycle.

31. The portable simulation game apparatus of claim 27, wherein the means for moving the three dimensional vehicle relative to the housing includes a pivotal attachment means pivotally attaching the vehicle bed to the housing, said pivotal attachment means is further in communication with the control means such that the control means may pivot the vehicle bed relative to the pre-programmed images being displayed on the display means.

32. The portable simulation game apparatus of claim 31 further comprising:
- a movable pedal supported by the housing and in communication with the control means to increase and decrease a speed of the three dimensional vehicle in relation to the pre-programmed images being display on the display means; and
- a lever supported by the housing to simulate a gear shift, said lever being in communication with the control means permits a user to shift between multiple gears provided by the three dimensional vehicle.

33. The portable simulation game apparatus of claim 32, wherein the three dimensional vehicle is a truck.

34. A portable simulation game apparatus comprising:
- a housing having a means for displaying pre-programmed images;
- a control means coupled to the display means for controlling and scrolling said pre-programmed images;
- a three dimensional object movably attached to the housing by an attachment means;
- an inner housing pivotally attached within the housing by a pitch mechanism, said pitch mechanism permits the inner housing to pitch upwardly and downwardly relative to the housing when the apparatus is tilted by a user forwards and backwards;
- a roll mechanism pivotally attaching the attachment means to the inner housing, said roll mechanism permits the three dimensional object to roll left or right relative to the housing when the apparatus is tilted by a user to the left or right;

a means for sensing a position and relative pitch and roll movement of the three dimensional object relative to the housing;

a means for transmitting to the control means said position or said relative pitch and roll movement;

when the control means receives a position or said relative pitch and roll movement from the transmitting means, the control means relates said position or said relative pitch and roll movement of the three dimensional object to the pre-programmed images on the display means, such that the control means may alter said images on the display means in response to said position or said relative pitch and roll movement.

35. The apparatus of claim 34, wherein the pitch mechanism and the roll mechanism separately include a plurality of sensors to sense the position of the three dimensional object relative to the housing or the pitch or roll movement of said three dimensional object relative to the housing, said plurality of sensors in communication with the control means for transmitting said position and said pitch or roll movement of said three dimensional object.

36. The apparatus of claim 35 further comprising a pair of handles supported by the housing and configured to be gripped by a user, each handle having a button in communication with the control means to increase or decrease a rate in which the pre-programmed images are being scrolled on the display means.

37. The portable simulation game of claim 35 further comprising a handle extending downwardly from the housing and constructed to be gripped by a user;

a trigger defined by the handle, said trigger in communication with the control means to increase and decrease a rate in which the pre-programmed images are being scrolled on the display means; and a joystick supported by the housing and connected to the attachment means such that when the joystick is pushed forwards or backwards the three dimensional object pitches forwards or backwards and such that when the joystick is pushed to the left or right the three dimensional object rolls to the left or right.

38. The portable simulation game of claim 36 or 37 wherein the three dimensional vehicle is air vehicle.

* * * * *